United States Patent
Harada et al.

(10) Patent No.: US 7,703,143 B2
(45) Date of Patent: Apr. 20, 2010

(54) INFORMATION PROCESSING APPARATUS, IMAGE FORMING APPARATUS, AND ELECTRONIC DATA MOVEMENT CANCELING METHOD

(75) Inventors: Toru Harada, Kanagawa (JP); Hiroyuki Kimbara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1032 days.

(21) Appl. No.: 11/009,415

(22) Filed: Dec. 13, 2004

(65) Prior Publication Data
US 2005/0159972 A1 Jul. 21, 2005

(30) Foreign Application Priority Data
Dec. 15, 2003 (JP) .............................. 2003-416454
Dec. 7, 2004 (JP) .............................. 2004-354089

(51) Int. Cl.
*G06F 7/04* (2006.01)
(52) U.S. Cl. .............................. 726/26; 726/27; 726/28; 726/29; 726/30; 726/31; 726/32; 726/33; 380/201; 380/202; 380/232; 380/241; 705/57; 705/58; 705/59; 705/67; 705/72
(58) Field of Classification Search ......... 380/201–202, 380/232, 241; 726/26–33; 705/57–59, 67, 705/72
See application file for complete search history.

(56) References Cited

U.S. PATENT DOCUMENTS

| 5,805,699 | A | | 9/1998 | Akiyama et al. | |
|---|---|---|---|---|---|
| 6,687,829 | B1 | * | 2/2004 | Miyamoto et al. | 726/7 |
| 6,745,166 | B1 | * | 6/2004 | Sugahara et al. | 705/57 |
| 6,993,135 | B2 | * | 1/2006 | Ishibashi | 380/277 |
| 7,096,504 | B1 | * | 8/2006 | Tagawa et al. | 726/27 |
| 7,159,244 | B2 | * | 1/2007 | Matsushima et al. | 726/30 |
| 2001/0032088 | A1 | * | 10/2001 | Utsumi et al. | 705/1 |
| 2002/0013772 | A1 | * | 1/2002 | Peinado | 705/51 |
| 2002/0029347 | A1 | * | 3/2002 | Edelman | 713/193 |
| 2002/0143915 | A1 | * | 10/2002 | Mathieson | 709/223 |
| 2003/0097454 | A1 | * | 5/2003 | Yamakawa et al. | 709/229 |
| 2003/0177379 | A1 | * | 9/2003 | Hori et al. | 713/193 |
| 2003/0182204 | A1 | * | 9/2003 | Rhee | 705/26 |

(Continued)

FOREIGN PATENT DOCUMENTS

EP 1 054 398 A2 11/2000

(Continued)

*Primary Examiner*—Christian LaForgia
*Assistant Examiner*—Canh Le
(74) *Attorney, Agent, or Firm*—Oblon, Spivak, McClelland, Maier & Neustadt, L.L.P.

(57) ABSTRACT

An information processing apparatus deleting, from a second recording medium, a copy of electronic data once recorded in the second recording medium, an original of the electronic data being recorded in a first recording medium different from the second recording medium, includes: an electronic data deleting part deleting the copy of the electronic data from the second recording medium, which copy can be used when authentication is succeeded in based on medium identification information which is prepared for identifying the first recording medium; an electronic data validating part validating the electronic data once invalidated when the copy of the electronic data was created in the second recording medium; and a medium identification information deleting part deleting the medium identification information of the first recording medium which was recorded in a predetermined storage area when the copy was created in the second recording medium.

24 Claims, 33 Drawing Sheets

U.S. PATENT DOCUMENTS

| | | | |
|---|---|---|---|
| 2003/0187682 A1* | 10/2003 | Ozawa et al. | 705/1 |
| 2003/0190044 A1* | 10/2003 | Higashi et al. | 380/201 |
| 2003/0195905 A1* | 10/2003 | Morohashi | 707/204 |
| 2004/0015713 A1* | 1/2004 | Abe et al. | 713/200 |
| 2004/0015716 A1* | 1/2004 | Abe et al. | 713/200 |
| 2004/0036904 A1 | 2/2004 | Kimbara | |
| 2004/0064630 A1* | 4/2004 | Nakashika | 711/4 |
| 2004/0109019 A1 | 6/2004 | Miyamoto et al. | |
| 2004/0230817 A1* | 11/2004 | Ma | 713/193 |
| 2006/0098937 A1* | 5/2006 | Bruls et al. | 386/46 |

FOREIGN PATENT DOCUMENTS

| | | |
|---|---|---|
| EP | 1 338 992 A1 | 8/2003 |
| JP | 2002-325146 | 11/2002 |
| JP | 2003-125122 | 4/2003 |
| JP | 2003-248626 | 9/2003 |
| JP | 2003-249965 | 9/2003 |
| JP | 2003-256151 | 9/2003 |
| JP | 2003-303130 | 10/2003 |
| JP | 2003-330652 | 11/2003 |
| WO | WO 03/034428 A2 | 4/2003 |

* cited by examiner

FIG.9

| IDENTIFICATION NUMBER | UN-COPY FLAG | ON-COPY FLAG | ALREADY-COPY FLAG | MODULE NAME |
|---|---|---|---|---|
| | | | | |
| | | | | |
| | | | | |

| NO. | UN-COPY | ON-COPY | ALREADY-COPY | MODULE NAME |
|---|---|---|---|---|
| 1 | o | | | C |
| 2 | o | | | D |
| 3 | o | | | E |
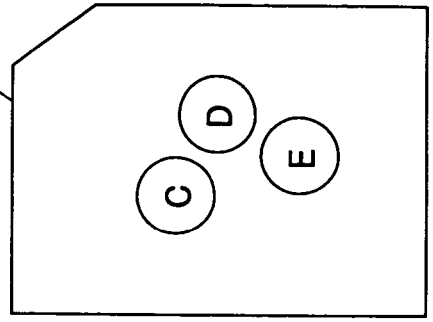
MOVEMENT-SOURCE SD CARD
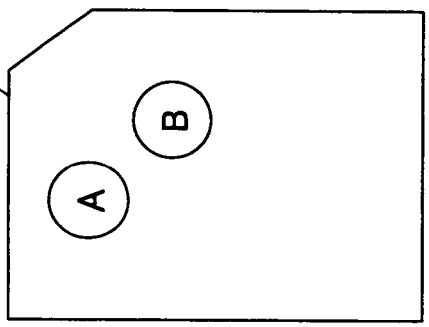
MOVEMENT-DESTINATION SD CARD
FIG.10

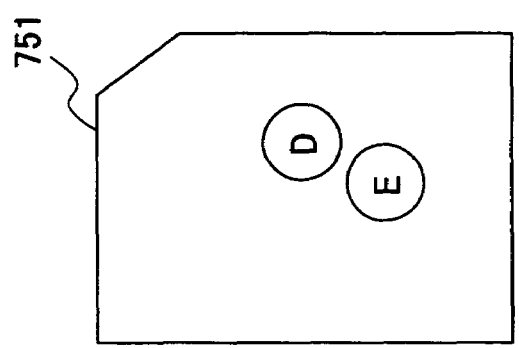
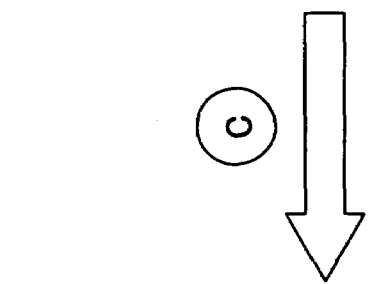
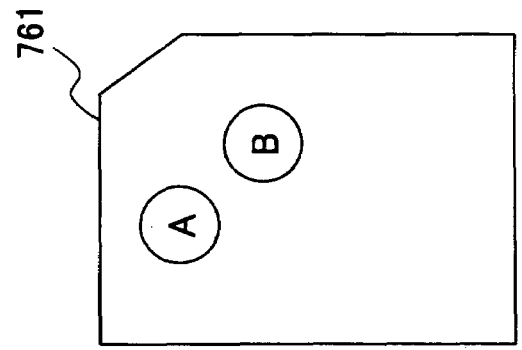
FIG.11

| NO. | UN-COPY | ON-COPY | ALREADY-COPY | MODULE NAME |
|---|---|---|---|---|
| 1 | | | o | C |
| 2 | o | | | D |
| 3 | o | | | E |
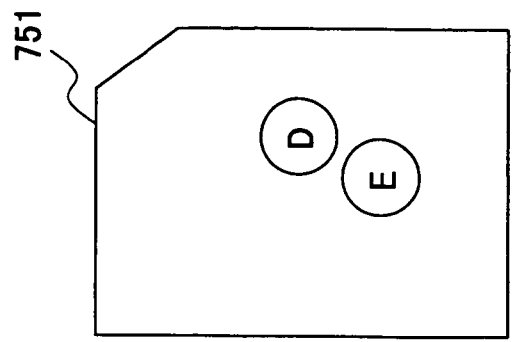
MOVEMENT-SOURCE SD CARD 751
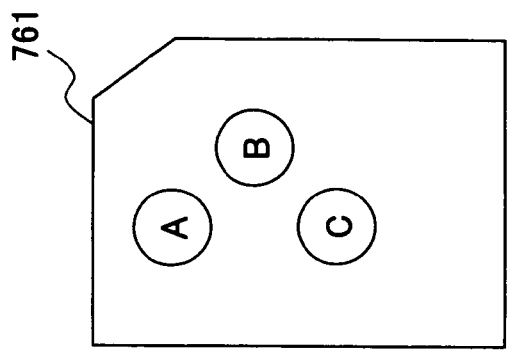
MOVEMENT-DESTINATION SD CARD 761
FIG.12

| NO. | UN-COPY | ON-COPY | ALREADY-COPY | MODULE NAME |
|---|---|---|---|---|
| 1 | | | o | C |
| 2 | | | o | D |
| 3 | | | o | E |
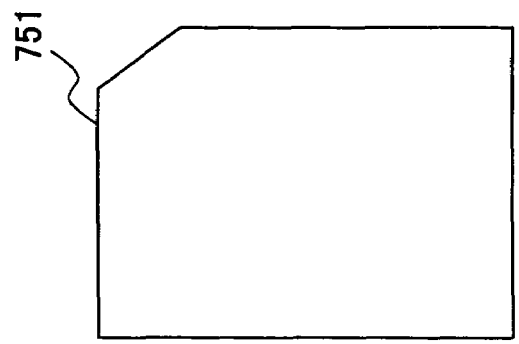
MOVEMENT-SOURCE SD CARD
751
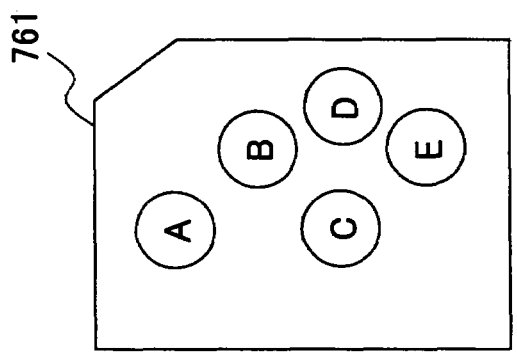
MOVEMENT-DESTINATION SD CARD
761
FIG.13

INFORMATION PROCESSING APPARATUS, IMAGE FORMING APPARATUS, AND ELECTRONIC DATA MOVEMENT CANCELING METHOD

BACKGROUND OF THE INVENTION

1. Field of the Invention

The present invention relates to an information processing apparatus, an image forming apparatus, and an electronic data movement canceling method, and, in particular, to an information processing apparatus, an image forming apparatus, and an electronic data movement canceling method for canceling processing of movement of electronic data between recording media.

2. Description of the Related Art

Recently, a multifunctional image forming apparatus (referred to as a 'fusion machine', hereinafter) has been provided which may function as a printer, a copier, a facsimile machine, a scanner or such as a result of a display part, a printing part, an image pickup part and so forth being provided in a single housing thereof, as well as relevant four programs enabling the machine to function as the printer, copier, facsimile machine, scanner or such being mounted therein and switching being made thereamong.

Such a fusion machine may be configured so that, in addition to the programs already mounted therein, another new function may be provided additionally as a result of an application module (simply referred to as a 'module' hereinafter), provided in a portable recording medium such as an SD card (which may also be called 'SD memory card'), being read in.

A fact that a new function may be easily added by means of an SD card or such s mentioned above may provide an advantage in particular in that an extensibility of the fusion machine is improved. On the other hand, since data stored in an SD card or such may be easily referred to via another apparatus such as a PC (personal computer) or such, the module stored in the medium may be tampered by a malicious person, whereby the tampered module may rather cause a fault in the fusion machine which executes the module. Furthermore, it is necessary to avoid illegal copy of the module stored in the SD card or such.

These problems may be solved as a result of the module being recorded in the SD card in the following manner: FIG. 1 shows an example of a configuration of the module in the SD card. In the SD card 510 shown in FIG. 1, an SDID 511 and a module 512 are stored. The SDID 511 is information (ID) used for identifying each particular SD card.

The module 512 includes a module file 513, a license file 514 and so forth. The module file 513 is a file in which a function to be achieved by the module is mounted. The license file 514 is a file in which license information of the module is stored.

The module file 513 includes program data 515, a module electronic signature and so forth. The program data 515 is a module program itself. Accordingly, as a result of the program data being processed, the function of the module is achieved. The module electronic signature 516 is used to verify a validity of the program data 515. That is, when execution of the module is requested, the fusion machine digitizes the program data by means of a message digest for example, and compares the thus-obtained value with a value of the electronic signature 516. When both values do not agree with one another, the fusion machine determines that the program data 515 is improper one, and thus, rejects execution thereof.

The license file 514 includes license data 517, a license electronic signature 518 and so forth. The license data 517 is data in which license data (for example, a term of validity, a number of usable times of validity, and so forth) of the module is recorded. Accordingly, when the license is invalid, or no license file 514 exists, the program data is not executed.

The license electronic signature 518 is data used for verifying a validity of the license data 517. That is, when execution of the module is requested, the fusion machine digitizes the license data 517 and the SDID 511 according to a message digest or such, compares the thus-obtained value with a value of the license electronic signature 518, and thus, determines a validity of the license data 517. Then, when the validity of the license data 517 is thus verified properly, a validity of the license of the module is then verified based on the license data 517.

Thus, the program data 515 and the license data 517 are authenticated with the use of the module electronic signature 516 or the license electronic signature 518, and thereby, it is possible to detect a tamper of the program data 515, the license data 517 or such. Thus, it is possible to avoid execution of an improper module.

Further, as a result of the SDID 511 being used for authenticating the license data 515, a unity between the module 512 and the SD card 510 may be ensured, whereby it is possible to avoid illegal copy of the module 512. That is, even if the module 512 is copied to another SD card, it is possible to detect that the copy was thus carried out as a result of the value digitized from the license data 517 and the SDID of this other SD card being compared with the license electronic signature 518 based on the SD card 510 and the SDID 511 upon authentication of the license data 517.

SUMMARY OF THE INVENTION

However, there may arise a demand that a proper user wishes to 'move' an arbitrary module from an SD card in which the module is originally stored to another SD card for the purpose of sorting out the recording media or such. For example, respective modules distributed to a plurality of SD cards will be collected in another large-capacity single SD card so as to achieve easier management of the recording media.

To 'move' in this case means that, same as a general term of 'move' for a file, the module from which the 'movement' has been carried out is then made invalid or deleted. That is, 'movement' is different from 'copying', creation of a new license is thus not required, and as a result, no significant disbenefit may occur even if 'movement' is allowed.

Notwithstanding, a user is not allowed actually to carry out 'movement' of the module between recording media in the above-described method. It is very convenient for the user if 'movement' of the module is allowed while safety is ensured. Further, it is further convenient for the user if the user can cancel (UNDO) 'movement' after the 'movement' of the module has been carried out. This is because, the user may erroneously carry out 'movement', or may wish to return to the state before the 'movement'.

The present invention has been devised in consideration of the above-mentioned problems, and, an object of the present invention is to provide an information processing apparatus, an image forming apparatus and an electronic data movement canceling method by which, in a case where electronic data, valid only when it is stored in a specific recording medium, is moved to another recording medium, it is possible to return to a state before the movement.

In order to achieve the above-mentioned object, according to the present invention, an information processing apparatus deleting, from a second recording medium, a copy of electronic data once recorded in the second recording medium, an original of the electronic data being previously recorded in a first recording medium different from the second recording medium, includes: an electronic data deleting part deleting the copy of the electronic data from the second recording medium, which copy can be actually used only when authentication thereof is succeeded in based on medium identification information which is previously provided for identifying the first recording medium; an electronic data validating part validating the electronic data once invalidated when the copy of the electronic data was created in the second recording medium; and a medium identification information deleting part deleting the medium identification information of the first recording medium once recorded in a predetermined storage area when the copy is created in the second recording medium.

In this information processing apparatus, in a case where a copy of electronic data which is originally recorded in the first recording medium is generated in the second recording medium and further the electronic data originally recorded in the first recording medium is made invalid so that movement of the electronic data is apparently achieved, it is possible to return to the state before the movement is thus carried out.

Further, in order to solve the above-mentioned problems, the present invention may be in a form of an electronic data movement canceling method.

BRIEF DESCRIPTION OF THE DRAWINGS

FIG. 9 shows one example of a data structure of the log file;

FIG. 10 shows an initial state of the log file created;

FIG. 11 shows a state of the log file when copy operation of one application module is started;

FIG. 12 shows a state of the log file when copy of the application module is completed;

FIG. 13 shows a state of the log file when copy of all the application modules is completed.

DETAILED DESCRIPTION OF THE PREFERRED EMBODIMENT

Figure 1:
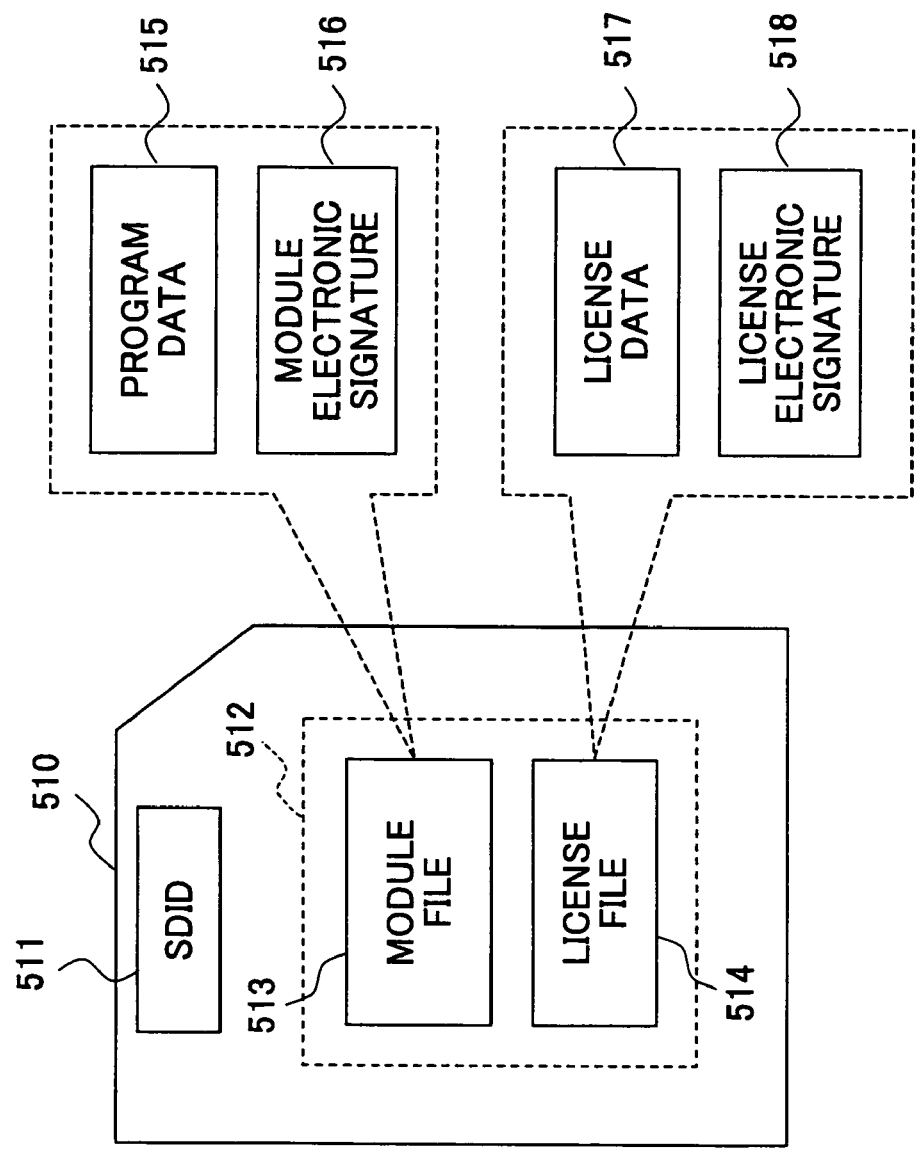
FIG. 1 shows an example of a configuration of a module in an SD card.
Figure 2:
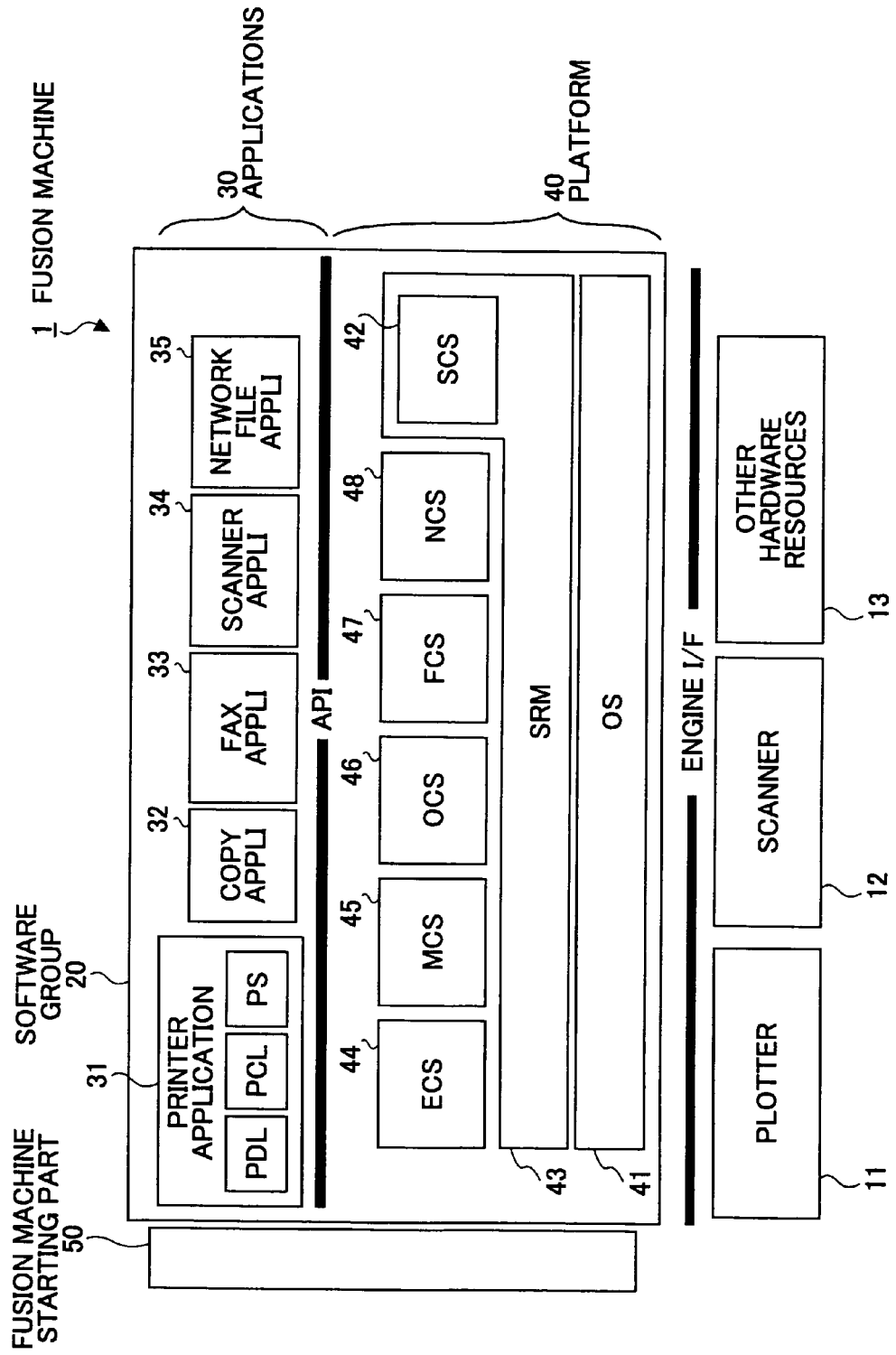
FIG. 2 shows a configuration of a fusion machine in one embodiment according to the present invention.

An embodiment of the present invention is described below with reference to figures. FIG. 2 shows a configuration of a fusion machine in an embodiment of the present invention. In the present embodiment, as a specific example of an information processing apparatus, the fusion machine which is a multifunctional image forming apparatus is applied. The fusion machine 1 includes a plotter 11, a scanner 12, and other hardware resources 13 such as a facsimile device; a software group 20 and a fusion machine start part 50. The software group 20 includes applications 30 and a platform 40.

The applications 30 are used for carrying out unique processing particularly for user services concerning image processing such as a printing process, a facsimile process, a scanner process or such.

The applications 30 include a printer application 31 which is an application for the printer having a page description language (PDL, PCL) and a postscript (PS); a copy application 32 for a copy process; a fax application 33 for a facsimile process; a scanner application 34 for a scanner process; and a net file application 35 for a network file.

The platform 40 includes a control service interpreting a processing request from the applications 30 and generating an acquisition request for a hardware resource; a system resource manager (referred to as an SRM, hereinafter) 43 carrying out management of at least one hardware resource and carrying out arbitration of acquisition requests given by the control service; and an operating system (referred to as an OS, hereinafter) 41.

The control service is configured to have at least one service module such as a system control service (referred to as an SCS, hereinafter) 42, an engine control service (referred to as an ECS, hereinafter) 44, a memory control service (referred to as an MCS, hereinafter) 45, an operation panel control service (referred to as an OSC, hereinafter) 46, a fax control service (referred to as an FCS, hereinafter) 47, a network control service (referred to as an NCS, hereinafter) 48, or such.

The platform 40 is configured to have an application program interface (referred to as an API, hereinafter) by which the processing request given by the applications 30 can be received by means of a previously defined function. The OS 41 is made of a UNIX (registered trade name) or such, and regards respective software of the applications 30 or the platform 40 as processes, and executes them in parallel.

A process of the SRM 43 carries out system control and management of the hardware resources. For example, the process of the SRM 43 carries out arbitration according to a request from an upper layer which uses the engine, memory, HDD file, host I/O (Centro I/F, network I/F, IEEE1394 I/F, RS232C I/R or such) or such, and carries out control of execution.

Specifically, the SRM 43 determines whether or not the required hardware resource is available (that is, not used by another request), and, when it is available, notifies this matter to the upper layer. Further, the SRM 43 carries out scheduling for using the hardware resource according to a request from the upper layer, and caries out the requested contents (for example, paper conveyance and image forming processing by means of the printer engine, ensuing a memory, file generation or such) directly.

A process of the SCS 42 caries out application management, operation part control, system page display, LED display, hardware resource management, interrupt application control, or such. A process of the ECS 44 carries out engine control of the plotter 11, the scanner 12 and the other hardware resources 13.

A process of the MCS 45 carries out memory control such as obtaining and releasing an image memory, usage of the HDD, compression/decompression of image data or such. A process of the OCS 46 carries out control of an operation panel which acts as an information transmitting agent between an operator and the apparatus body control.

A process of the FCS 47 provides an API for carrying out facsimile transmission/reception with the use of a PSTN or an ISDN network from each application layer of the system controller, registration/citation of various sorts of facsimile data managed in a memory for backup, facsimile reading, facsimile reception printing, combined transmission/reception or such.

A process of the NCS 48 provides a service which is available in common among the applications which require a network I/O, and acts as an agent distributing data received from the side of the network according to each protocol to the respective applications, or transmitting data from the respective applications to the side of the network.

For example, the NCS 48 controls data communication with a network device according to HTTP (hypertext transfer protocol) with the use of an httpd (hypertext transfer protocol daemon).

The fusion machine start part 50 is executed first when power supply is turned on in the fusion machine 1, and starts the platform 40 or the applications 30.

The fusion machine 1 can unitarily manage processing which is required in common among the respective applications in the platform 40. Next, a hardware configuration of the fusion machine 1 is described.

Figure 3:
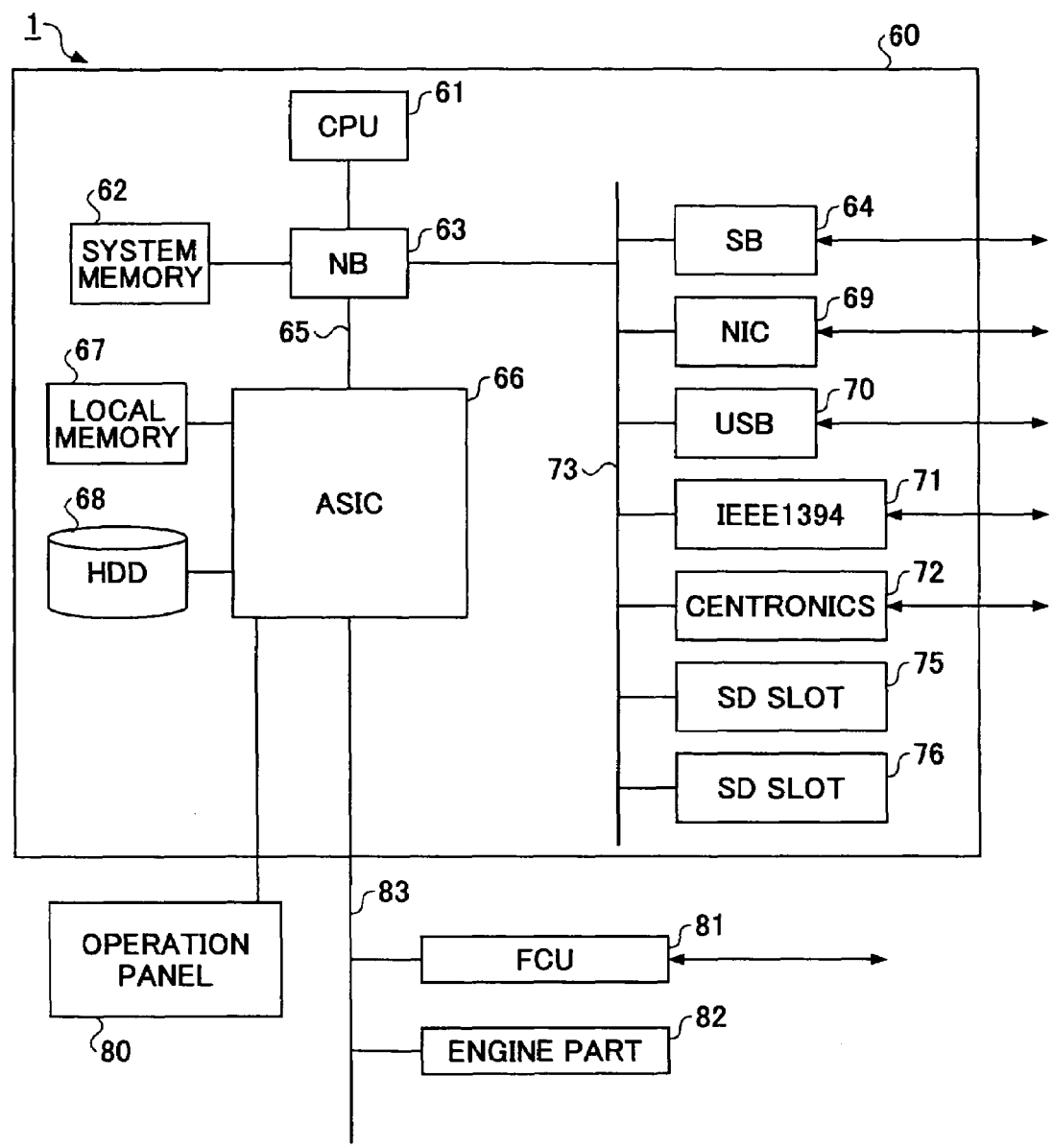
FIG. 3 shows a hardware configuration of the fusion machine in the embodiment of the present invention.

FIG. 3 shows a hardware configuration of the fusion machine 1 in the embodiment of the present invention described above. As shown, the fusion machine 1 includes a controller 60, the operation panel 80, an FCU 81 and an engine part 82.

The controller 60 includes a CPU 61, a system memory 62, a north bridge (NB) 63, a south bridge (SB) 64, an ASIC 66, a local memory 67, a HDD 68, a network interface card (NIC) 69, a USB device 70, an IEEE1394 device 71, a centronics device 72, an SD slot 75, and an SD slot 76.

The operation panel 80 is connected to the ASIC 66 of the controller 60. The FCU 81 and the engine part 82 are connected to the ASIC 66 of the controller 60 via a PCI bus 83.

In the controller 60, to the ASIC 60, the local memory 67, the HDD 68 and so forth are connected, and also, the CPU 61 and the ASIC 66 are connected via the NB 63 which is a CPU chip set. The CPU 61 and the ASIC 66 being connected via the NB 63 in the controller 60 for a case where an interface of the CPU 61 is not disclosed. It is noted that the ASIC 66 and the NB 63 are connected together via an AGP (accelerated graphic port) 65.

Thus, in order to carry out control and execution of at least one process included in the applications 30 or the platform, the ASIC 66 and the NB 63 are connected, not via a low-speed PCI bus but via the AGP 65. Thus, it is possible to avoid degradation in performance.

The CPU 61 carries out control of the fusion machine 1 totally. The CPU 61 starts and executes the SCS 42, the SRM 43, the ECS 44, the MCS 45, the OCS 46, the FCS 47 or the NCS 48 with the OS 41, and also, starts and executes the printer application 31, the copy application 42, the fax application 33, the scanner application 34 or the net file application 35 included in the applications 30.

The NB 63 is a bridge for connecting the CPU 61, the system memory 62, the SB 64, the ASIC 66, the NIC 69, the USB 70, the IEEE1394 device 71 and the centronics device 72.

The SB 64, the NIC 69, the USB device 70, the IEEE1394 device 71 and the centronics device 72 are connected to the NB 63 via the PCI bus 73. The SB 64 is a bridge for connecting the PCI bus 73 with a ROM, a peripheral device, or such.

The SD slots 75 and 76 are slots to which SD cards which are recording media in a type such that they can be inserted in or removed from such SD slots. Various sorts of application modules or such may be recorded in the SD cards. That is, it is possible to expand the functions of the fusion machine 1 with the use of application modules recorded the SD card. A user should prepare the SD card in which an application module for achieving a required function, and insert it in the SD slot 75 or 76. Thereby, it is possible to expand the functions of the fusion machine 1 easily.

The system memory 62 is used as an image drawing memory or such. The local memory 67 is used as a copy image buffer, a code buffer or such.

The ASIC 66 is an IC includes a hardware element specially prepared for image processing, and thus is specially prepared to be used for image processing. The HDD 68 is one example of storage (secondary storage device) used for storing image data, document data, program, font data, or such. The USB device 70, the IEEE device 1394 device 71, and the centronics device 72 are interfaces in compliance with respective standards.

The operation panel 80 acts as an operation part to receive input operation from an operator, and also, acts as a display part provides a display for the operator. The FCU 81 has a backup memory. The memory of the FCU 81 is used, for example, for temporarily storing facsimile data received, when the power source of the fusion machine 1 is turned off.

In the embodiment of the present invention, processing (application module moving processing) is carried out for moving the application module recorded in the SD card inserted in the SD slot 75 to another SD card inserted in the SD slot 76. It is noted that one or a plurality of application modules may be moved within a single action of the application module moving processing.

Figure 4:
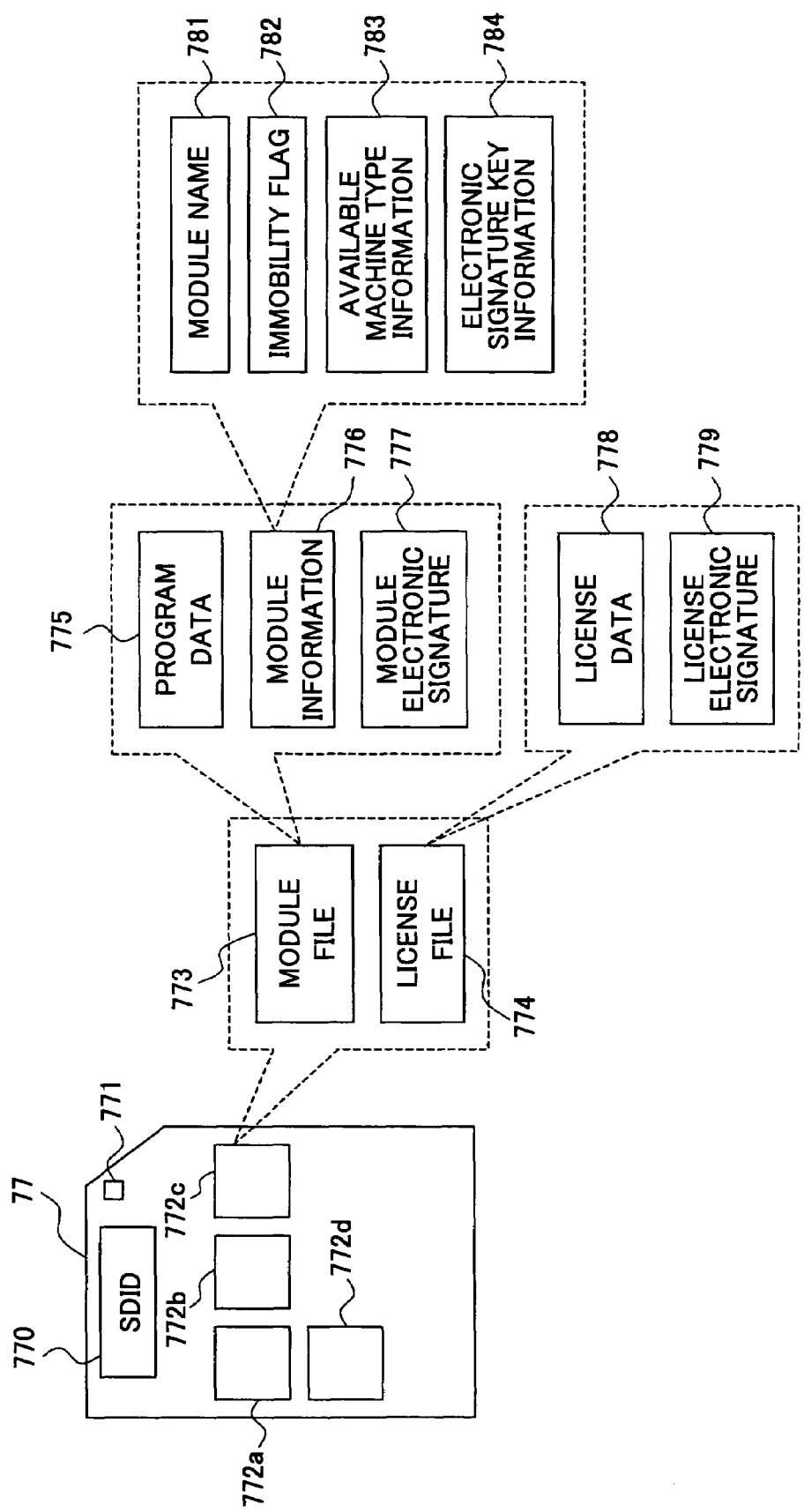
FIG. 4 illustrates information stored in an SD card.

FIG. 4 illustrates information stored in the SD card. As shown, in the SD card 77, an SDID 770, a license invalid flag 771, and at least application module, i.e., application modules 772a, 772b, 772c, 772d and so forth are stored.

The SDID 770 is information (ID) for identifying each particular SD card. The license invalid flag 771 is a flag used for determining a validity of the application modules stored in the SD card 77. That is, when the license invalid flag is ON, the fusion machine 1 determines that the application modules in the SD card 77 is invalid, and thus, rejects execution of the application modules 772a and so forth.

Each application module includes a module file 773 and a license file 774, as shown. The module file 773 is a file in which a function for achieving a function which the module caries out is mounted. The license file 774 is a file in which license information of the application module is stored.

The module file 773 includes program data 775, module information 776 and a module electronic signature 777. The program data 775 is an application module program itself. Therefore, as a result of the program data 775 being processed by the CPU 61, the function o the application module is actually obtained. The module information 776 is attribute information of the application module, and includes a module name 781, an immobility flag 782, applicable machine type information 783 and electronic signature key information 784.

The module name 781 is a name of the application module. The immobility flag 782 is a flag which indicates whether or not movement of the application to another SD card is allowed. The applicable machine type information 783 is information for identifying a machine type (a machine type of the fusion machine 1) in which the application module can be properly operated. The electronic signature key information 784 is key information required for decoding the module electronic signature 777 or the license electronic signature 779 coded.

The module electronic signature 777 is used to verify a validity of the program data 775. That is, when execution of the application module is required, the fusion machine 1 digitizes the program data 775 according to a message digest for example, and also, decodes the module electronic signature 777 with the use of the electronic signature key information 784. Then, the fusion machine 1 compares both of the thus-obtained values. Then, when both do not agree with each other, the fusion machine 1 determines that the program data 775 is improper data, and thus, rejects execution thereof.

The license file 774 includes license data 778 and a license electronic signature 779. The license data 778 is data in which license information (for example, a term of validity, a number of times of usage in validity or such) of the application module is recorded.

The license electronic signature 779 is data used for verifying a validity of the license data 778. That is, when execution of the application module is requested, the fusion machine 1 digitizes the license data 778 and the SDID 770 according to a message digest or such for example, and also, decodes the license electronic signature 779 with the use of the electronic signature key information 784. Then, the fusion machine 1 compares both so as to verify a validity of the license data 778. After the license data 778 is thus verified as being valid, the fusion machine 1 determines a validity of the license of the application module based on the license data 778.

As described above for the related art, as a result of not only the license data 778 but also the SDID 770 being used to determine the validity of the license data 778, it is possible to avoid illegal copy of the application module to another SD card.

The license invalid flag 771 is described in further detail. Generally speaking, 'movement of a file' includes deletion of the movement-source file, as mentioned above. In this light, the moving processing of the application module in the embodiment of the present invention is different from the 'movement of a file' in terms of the precise meaning of the term, and rather, corresponds to 'copying'. That is, in the present embodiment, the fusion machine 1 does not actually delete the application module in the movement-source SD card. This is because, if the movement-source application module were actually deleted upon the moving processing, the application module would completely vanish even if a fault occurs during the moving processing, and such a situation should be avoided preferably.

However, a state in which the copy-source application module were still available is not preferable. As will be described later, if the copy-source application were still available after the copy-destination application module becomes available, determination of a validity of the license data 778 with the use of the SDID 770 would have no sense, and such a way might promote illegal copy.

Therefor, the license invalid flag 771 of the copy-source SD card is turned ON, and thus, the copy-source application module is made not actually usable (invalidated) in a software manner. Thereby, the moving processing in the original meaning of the term is apparently achieved. However, the present invention is also applicable for a case where, same as the common file movement manner, the movement-source is made not available as a result of the movement-source application module being actually deleted.

In FIG. 4, the single license invalid flag 771 is provided for the SD card 77. This configuration is advantageous because of its simplified manner for a case where all the application modules stored in the SD card 77 is always moved simultaneously. However, according to this configuration, the license invalid flag 771 is turned ON even when only the single application module 772a is moved to another SD card, for example. In such a case, the application modules other than the application module 772a actually moved cannot be executed thereafter. In order to solve this problem, the license invalid flag 771 may be provided for each of the application modules.

Figure 5:
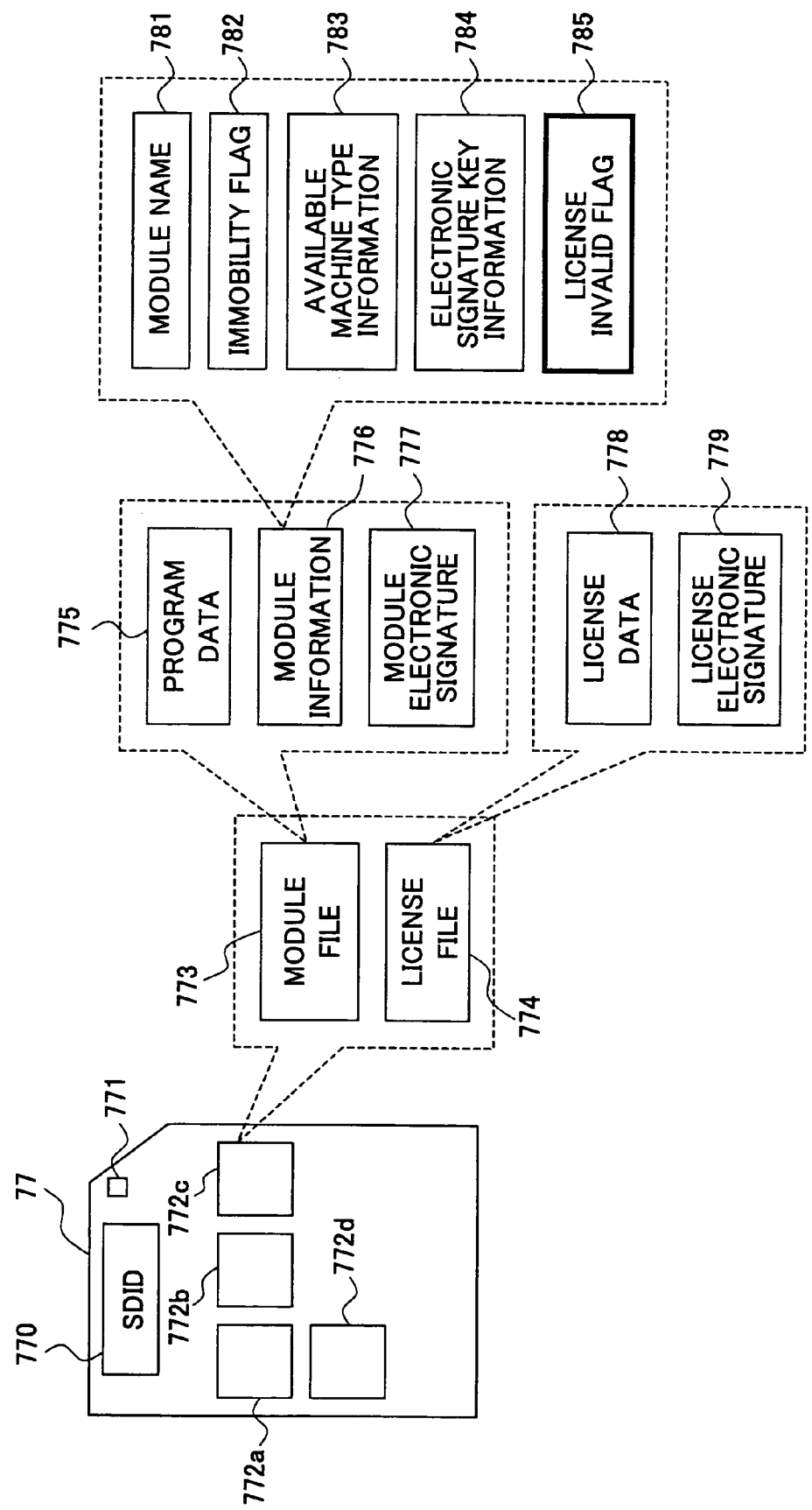
FIG. 5 shows an example in which a license invalid flag is provided for each application module.

FIG. 5 shows an example in which the license invalid flag 771 is provided for each application modules. In this figure, the same reference numerals are given to parts the same as those in FIG. 4, and duplicate description thereof is omitted. In the SD card 77 shown in FIG. 5, the license invalid flag 771 does not exist, but instead, a license invalid flag 785 is provided in the module information 776 of each application module.

In a case where the license invalid flag 771 is provided for each application module as shown in FIG. 5, only the license invalid flag of the application module which is actually moved should be turned ON. Thereby, the other application modules left unmoved and thus still stored in the movement-source SD card are stile executable. Hereinafter, description is made assuming this configuration shown in FIG. 5.

Figure 6:
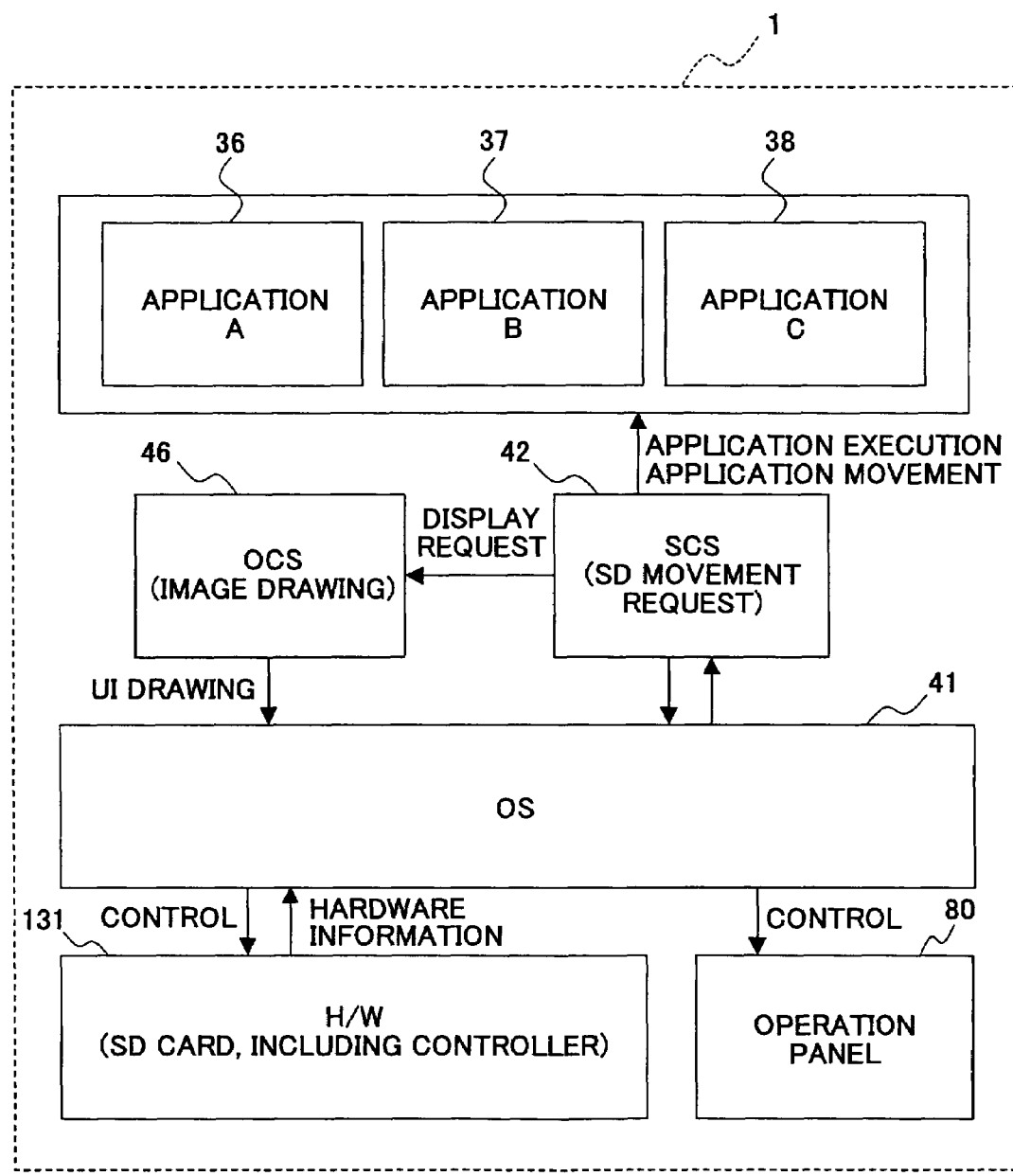
FIG. 6 shows an example of a configuration of the fusion machine configured so that application module movement processing may be achieved.

FIG. 6 shows an example of a configuration in the fusion machine for achieving the application moving processing. That is, FIG. 6 shows a part extracted from the configuration shown in FIG. 2 only concerning the application moving processing. In FIG. 6, the same reference numerals are given to parts the same as those of FIG. 6, and duplicate description is omitted.

An application A 36, an application B 37, an application C 38 and so forth shown in FIG. 6 are the same as the various sorts of application modules (the printer application 31, the copy application 32, the fax application 33 and so forth) included in the applications 30 in FIG. 2, but expressed in an abstraction manner. However, the applications A 36 and so forth shown in FIG. 6 are not those previously incorporated in the fusion machine 1 but those recorded in the SD card inserted in the SD slot 75 or 76.

In the embodiment of the present invention, the SCS 42 caries out control of the application module moving processing. Further, the OCS 46 carries out, based on a request from the SCS 42, display of various sorts of pages concerning the application module moving processing on the operation panel 80.

Figure 7:
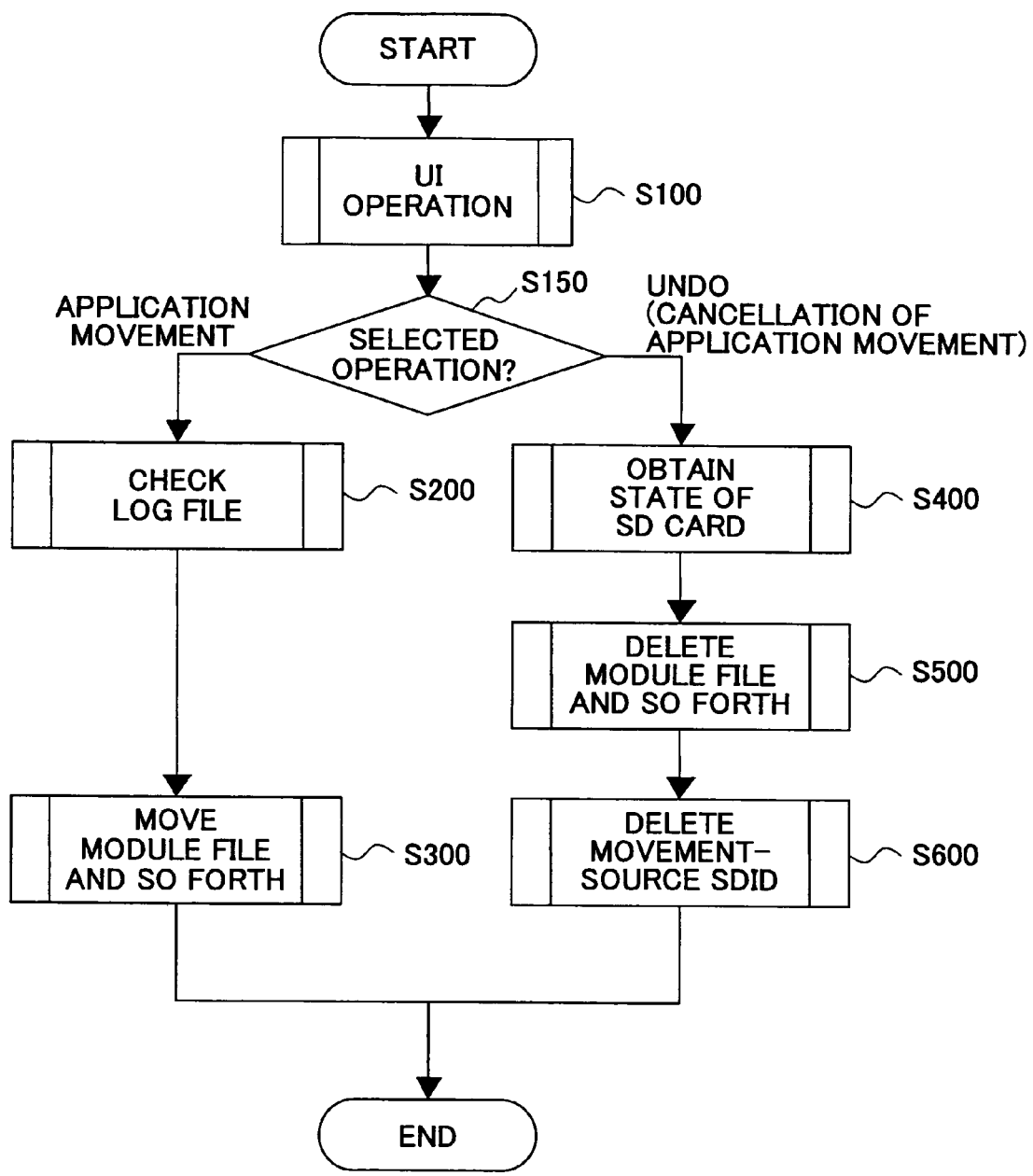
FIG. 7 shows a flow chart roughly illustrating processing carried out in the fusion machine.

Processing procedure of the fusion machine 1 of FIG. 6 is described next. FIG. 7 shows a flow chart illustrating the processing of the fusion machine 1. First, the user selects an item from a page displayed on the operation panel so as to input as to whether or not the application module moving processing is to be carried out (S100). When the application module moving processing is to be carried out, the relevant processing is started.

That is, first, a log file is checked (S200), and processing of moving the module file 773, the license file 774 and so forth of the application module is started (S300).

As to cancellation of the movement, description will be made after details of the moving processing, that is, details of the log file checking processing (S200) and the moving processing of the module file 773 and so forth (S300) are described.

Figure 8:
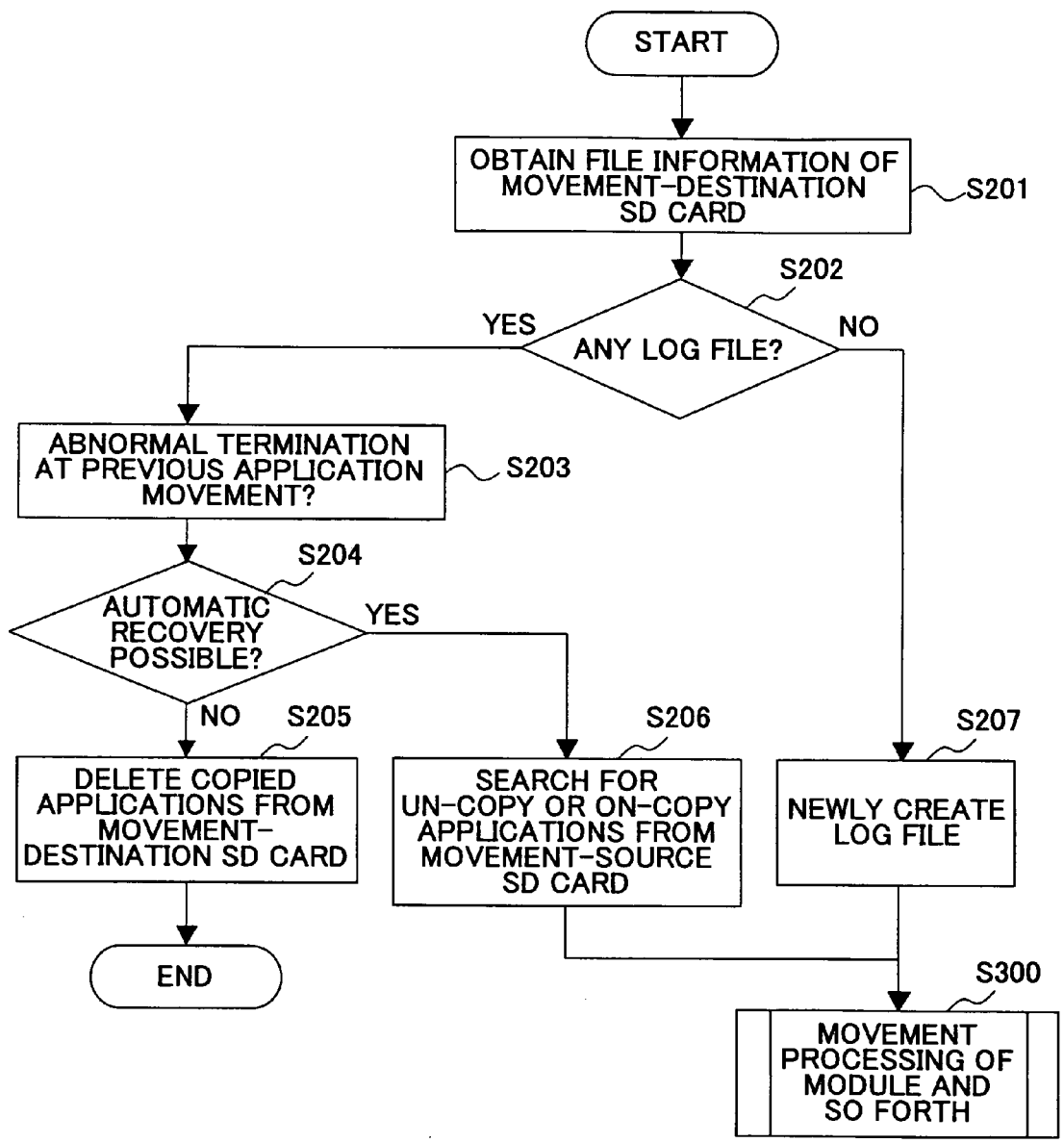
FIG. 8 shows a flow chart illustrating log file check processing.

FIG. 8 shows a flow chart illustrating the log file checking processing.

First, the SCS 42 obtains file information stored in the SD card of an application module movement destination (in this example, the SD card inserted in the SD slot 76, and referred to as a 'movement-destination SD card 761', hereinafter), and thus, determines whether or not a log file exists in the movement-destination SD card 761 (S201).

The log file is a file in which a process actually carried out in the application module moving processing is recorded, and, is created in the movement-destination SD card 761 in processing (S207) described later.

FIG. 9 shows an example of a configuration of the log file. As shown, in the log file, for each application module, an identification number, an un-copy flag, an on-copy flag and an already-copy flag (generally referred to as 'copy state flags', hereinafter), a module name and so forth are recorded.

The identification number is a number for identifying each record of the log file. The un-copy flag, the on-copy flag and the already-copy flag are flags for identifying statuses of the application module moving processing, and indicate that copy of the module file 773 or such is not yet started, that the same are on operation and that the copy is already finished, respectively. The module name is a name of the application module (module name 781).

The log file is deleted at a timing at which movement of all the application modules for which the movement is requested has been completed. Accordingly, if the log file still exists in the movement-destination SD card 761, Step S203 is carried out, and the SCS 42 determines that an abnormal termination occurred in previous application module moving processing due to some cause, for example, an accidental power source break occurring during the processing or such.

Step S204 is carried out after Step S203, and the SCS 42 determines whether or not continuation of processing (automatic recovery) from the relevant abnormal termination timing, that is, from the relevant terminated state can be carried out.

When it is determined that the automatic recovery is not possible, Step S205 is carried out, and the SCS 42 determines from the log file the application modules already copied to the movement-destination SD card 761 until the processing was abnormally terminated in the previous processing, and deletes the module files 773 and so forth of the thus-obtained application modules.

When it is determined that the automatic recovery can be carried out, Step S206 is carried out, and the SCS 42 searches the movement-source SD card (in this example, the SD card inserted in the SD slot 75, and referred to as 'movement-source SD card 751' hereinafter) for the application modules which were on copy or not yet copied at the time the previous moving processing was abnormally terminated, based on the log file, and executes moving processing of the module file 773 and so forth for the thus-retrieved application modules (S300).

In Step S202, when it is determined that no log file exists, Step S207 is executed, and the SCS 42 newly creates a log file in the movement-destination SD card 716.

FIG. 10 shows an initial state of the log file thus created. In FIG. 10, the application modules having module names 'C', 'D' and 'E' stored in the movement-source SD card 751 are those requested to be moved, for example. Since copy of all the application modules is not started yet, the un-copy flag of each of the application modules in the initial state has a value '0', as shown.

After Step S207, Step S300 is executed, and the SCS 42 executes moving processing for the module files 773 and so forth.

During the application module moving processing, the contents of the log file changes as follows:

FIG. 11 shows a state of the log file when copy of the application file is started. Specifically, FIG. 11 shows the state of the log file in which copy of the application module with the module name of 'C' is started. As shown, when the copy is started, a value of the on-copy flag of the relevant application module becomes '0'.

FIG. 12 shows a state of the log file when copy of the application file has been completed. Specifically, FIG. 12 shows the state of the log file in which copy of the application module with the module name of 'C' has been completed. As shown, when the copy has been completed, a value of the already-copy flag of the relevant application module becomes '0'.

FIG. 13 shows a state of the log file when copy of all the designated application modules has been completed. As shown, the already-copy flags of all the application modules come to have the value '0'.

Figure 14:
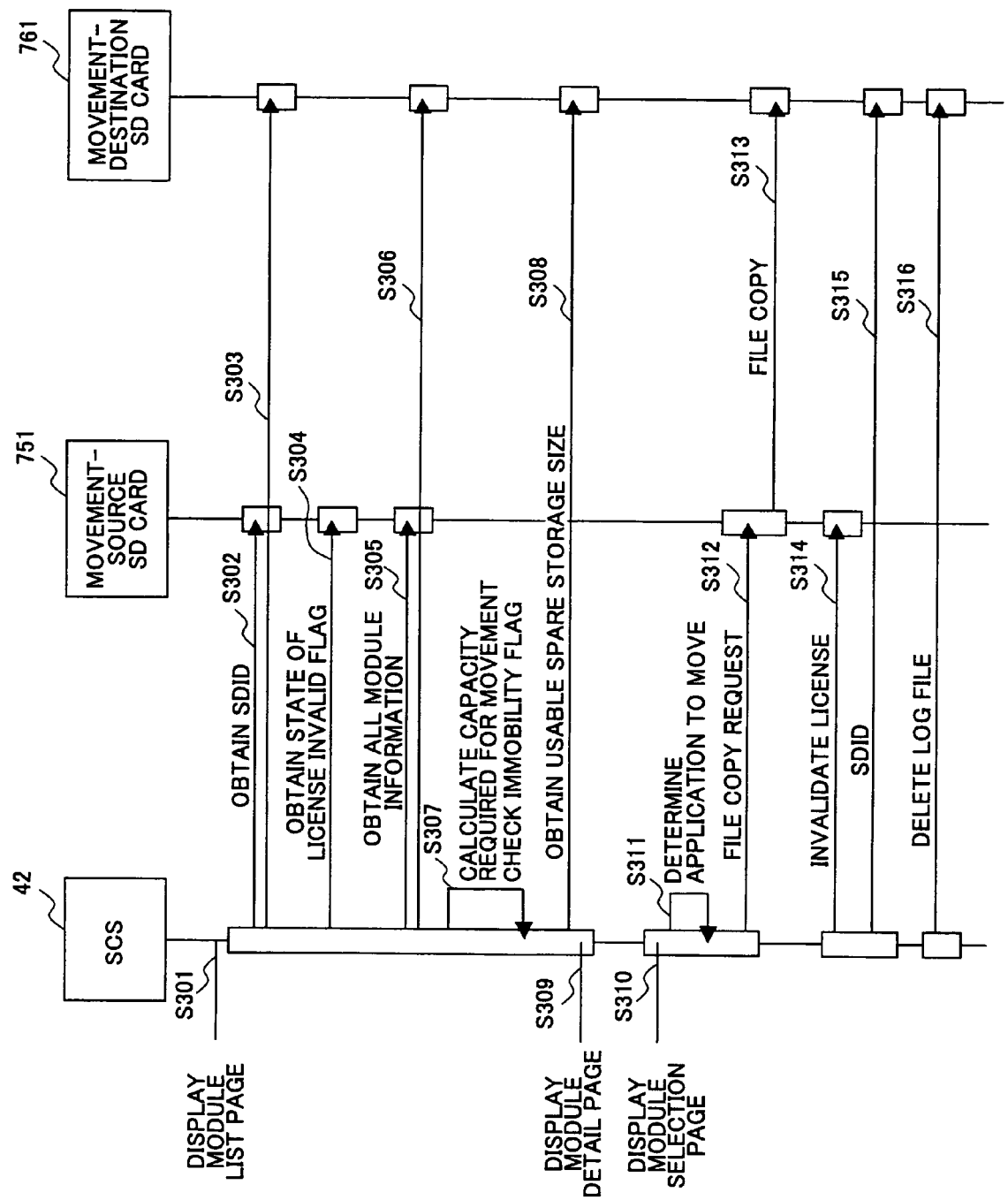
FIG. 14 shows a sequence diagram illustrating movement processing of a module file or such.

Next, details of the moving processing (S300) of the module file 773 and so forth are described. FIG. 14 shows a sequence diagram illustrating the moving processing of the module file and so forth.

Figure 15:
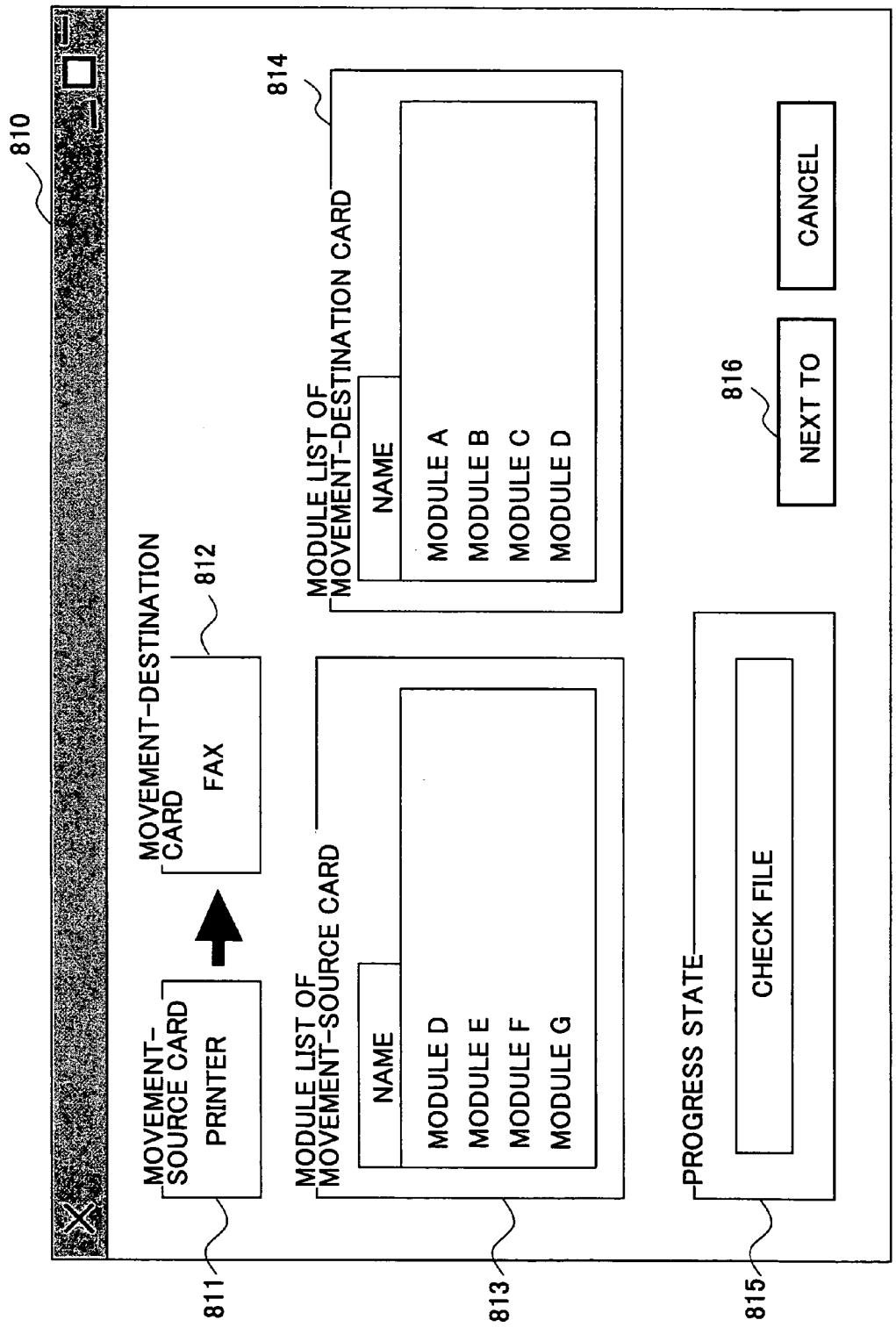
FIG. 15 shows one example of display of a module list page.

First, based on a request from the SCS 42, the OCS 46 displays a page (referred to as a 'module list page', hereinafter) on the operation panel 80 showing lists of the application modules stored in the movement-source SD card 751 and the movement-destination SD card 761 (S301), respectively, as shown in FIG. 15.

FIG. 15 shows an example of display of the module list page. In the module list page 810 shown, types of the application modules stored in the movement-source SD card 751 and the movement-destination SD card 761 are indicated in areas 811 and 812, respectively. From these areas 811 and 812, it can be seen that the application modules stored in the movement-source SD card 751 and the movement-destination SD card 761 are those concerning the printer function and the fax function, respectively.

In areas 813 and 814, lists of module names of the application modules stored in the movement-source SD card 751 and the movement-destination SD card 761 are shown, respectively. In an area 815, a progress state (step) of the application module moving processing is shown.

By referring to this module list page 810, a user can roughly recognize respective states of the movement-source SD card 751 and the movement-destination SD card 761.

When the user presses a 'next to' button 816 to proceed with the moving processing, the SCS 42 obtains the SDID 770 from each of the movement-source SD card 751 and the movement-destination SD card 761 (Steps S302, S303).

After Step S303, Step S304 is carried out, and, the SCS 42 obtains a value of the license invalid flag from the movement-source SD card 751, and thereby determines a validity of the movement-source SD card 751. When the value of the lichens invalid flag is ON, the SCS 42 stops the moving processing. The fact that the license invalid flag has the value ON means that this SD card has already undergone the moving processing as a moving source, and also, if the same SD card again underwent the moving processing as a moving source, notwithstanding this situation, the application modules would be 'copied' actually.

In Steps S305 and S306 subsequent to Step S304, the SCS 42 reads the module information 776 of all the application modules stored in the movement-source SD card 751 and in the movement-destination SD card 761.

In Step S307 subsequent to Step S306, the SCS 42 carries out calculation of a capacity required for movement of the application modules, check of values of the immobility flags of the respective application modules and so forth, so as to determine whether or not the moving processing can be actually carried out.

In Step S308 subsequent to Step S307, the SCS 42 obtains a spare area in the movement-destination SD card 761, from the movement-destination SD card 761. In Step S309 subsequent to Step S308, based on a request from the SCS 42, the OCS 46 displays on the operation panel 80 a page (referred to as a 'module detail page', hereinafter) showing detailed information of the application modules and so forth stored in the movement-source SD card 751 and in the movement-destination SD card 761.

Figure 16:
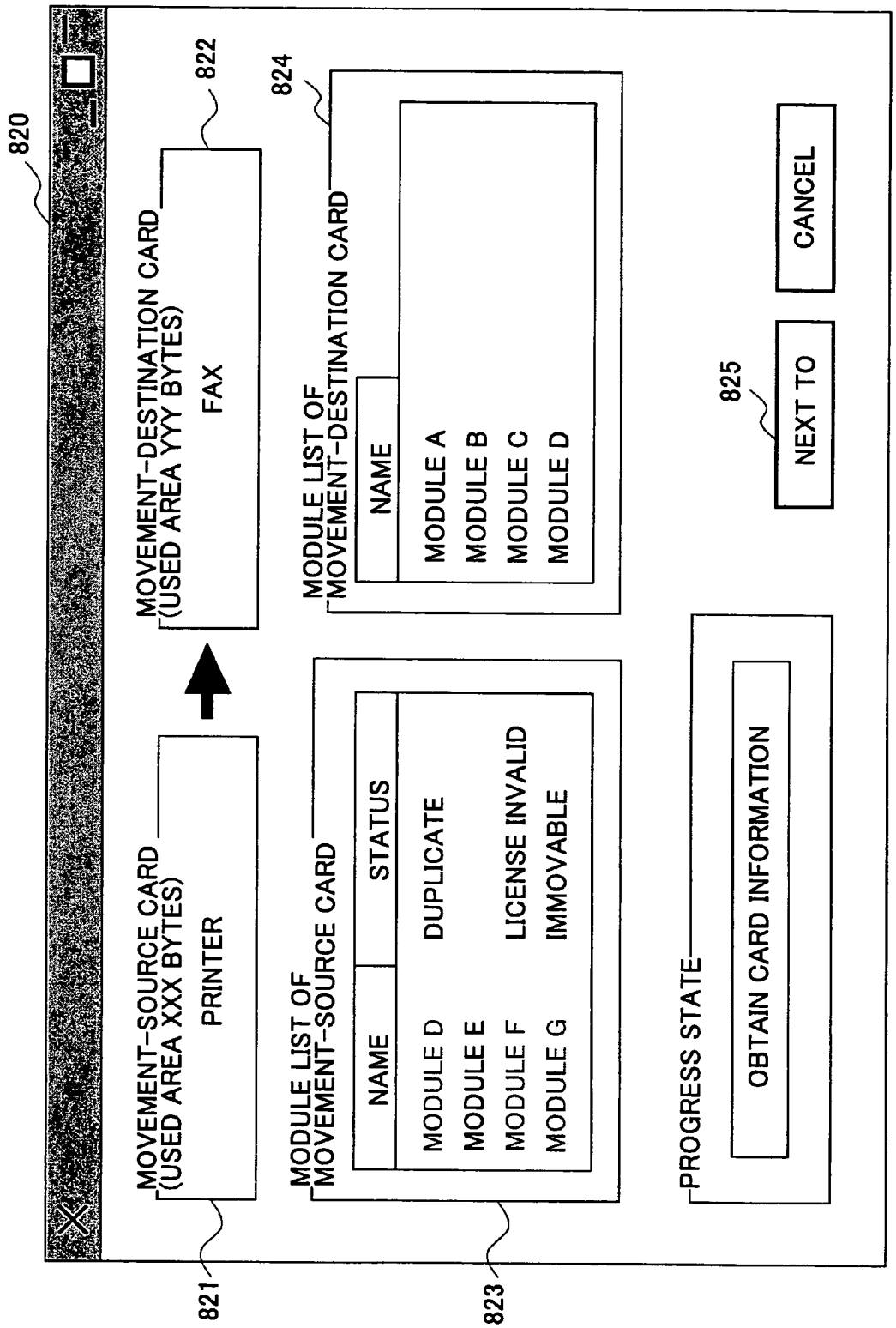
FIG. 16 shows one example of display of a module detail page.

FIG. 16 shows an example of the module detail page. In the module detail page 820 shown in FIG. 16, in addition to the types of the application modules stored in the movement-source SD card 751 and the movement-destination SD card 761, a used area of the movement-source SD card 751 and an unused area of the movement-destination SD card 761 are shown in areas 821 and 822, respectively.

In areas 823 and 824, lists of the module names of the application modules stored in the movement-source SD card 751 and the movement-destination SD card 761 are shown, respectively. For the movement-source SD card in particular, further, statues are shown for the respective application modules. For example, for the module F, a fact that the license invalid flag 785 is ON is shown. For the module G, a fact that, since the immobility flag 782 is ON, and thus, movement is not allowed, is shown.

The user can recognize the details of the movement-source SD card 751 and the movement-destination SD card 761 by refereeing to this module detail page 820.

When the user presses a 'next to' button 825 to proceed with the moving processing, the OCS 46 displays a page (referred to as a 'module selection page', hereinafter) for the user to select the application modules to actually move, from the operation panel 80 (S310).

Figure 17:
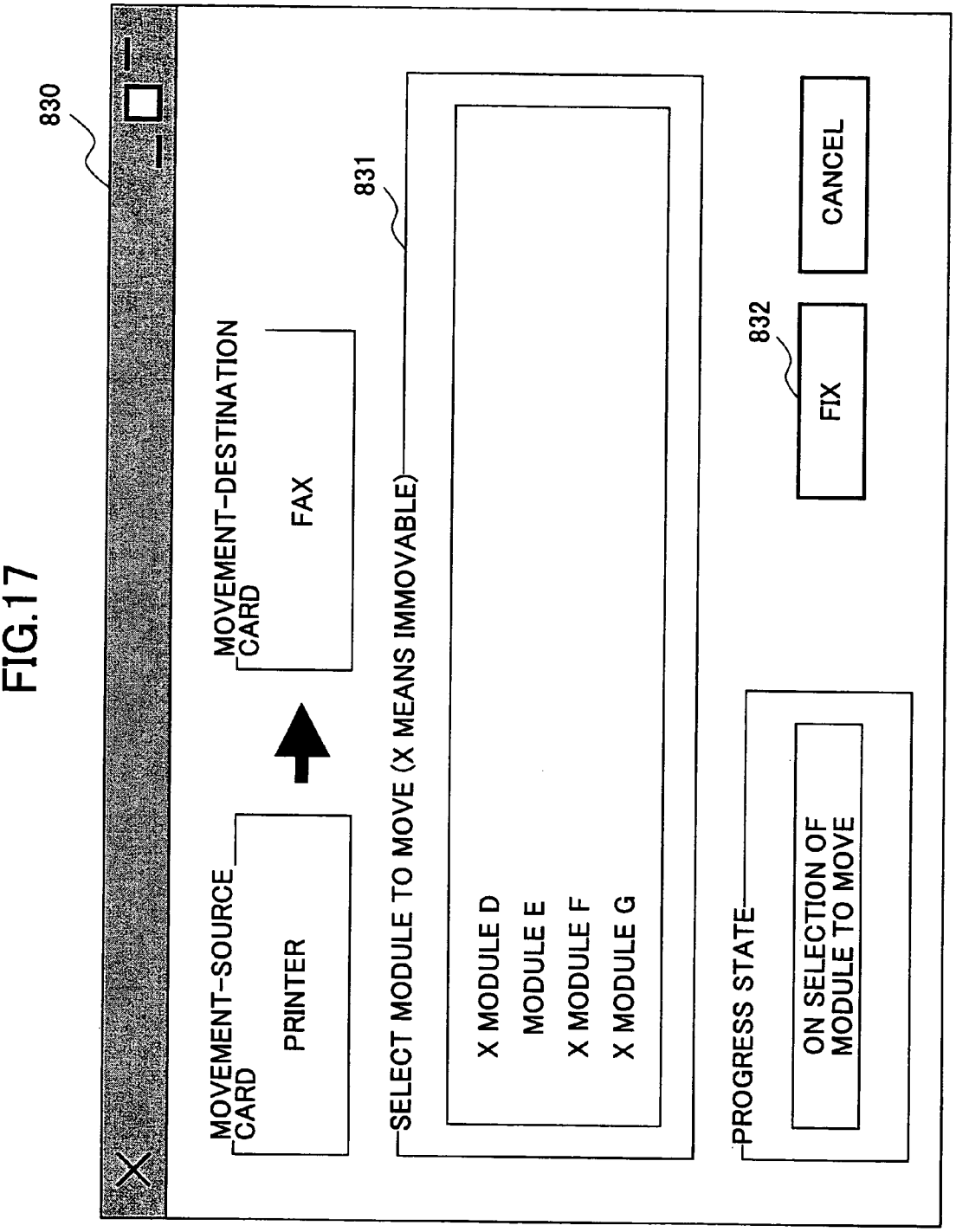
FIG. 17 shows one example of display of a module selection page.

FIG. 17 shows one example of display of the module selection page. From the module selection page 830 shown in FIG. 17, the user can select the application modules to actually move, from an area 831 particularly. In the area 831, a symbol 'X' attached to the module name of the application module means that the relevant application module cannot be moved due to a reason that the application module is duplicated, the immobility flag is ON, the license invalid flag is ON or such.

When the user presses a 'fix' button 832 to proceed with the moving processing, the SCS 42 recognizes the application module (referred to as 'target module', hereinafter) to actually move, based on the module selection page 830 (S311), and copies the module file 773 and the license file 774 of the target module to the movement-destination SD card 761 from the movement-source SD card 751 (S312, S313).

After the copy for all the target modules is completed, the SCS 42 turns the license invalid flag of each of the relevant movement-source target modules ON, and thus, invalidates them, in Step S314. In order to indicate that the license invalid flag is thus turned ON, the value of the SDID of the movement-destination SD card 761 may be applied to the value of the license invalid flag 785. Thereby, it becomes possible to trace the movement destination therefrom afterwards.

In Step S315 subsequent to Step S314, the SCS 42 writes the SDID 770 of the movement-source SD card 751 to the movement-destination SD card 761. As a result of the SDID 770 of the movement-source SD card 751 being thus written in the movement-destination SD card 761, execution of the application modules copied to the movement-destination is made possible. The details thereof are described later.

In Step S316 subsequent to Step S315, the SCS 42 deletes the log file created in the movement-destination SD card 761, and finishes the moving processing.

It is noted that, the order of the processing of Steps S312 through S315 may be changed in various manners. For example, the processing of writing of the SDID 770 of the movement-source SD card 751 in the movement-destination SD card 761 in Step S315 may be carried out before the processing of Steps S312 through S314. Further, the copying processing and the invalidating processing in Steps S312 through S314 may be carried out in a manner of loop processing for each application module. By applying the loop processing, even if the copying processing is interrupted, the application modules which have been already copied can be executed from the movement-destination SD card 761.

Figure 18:
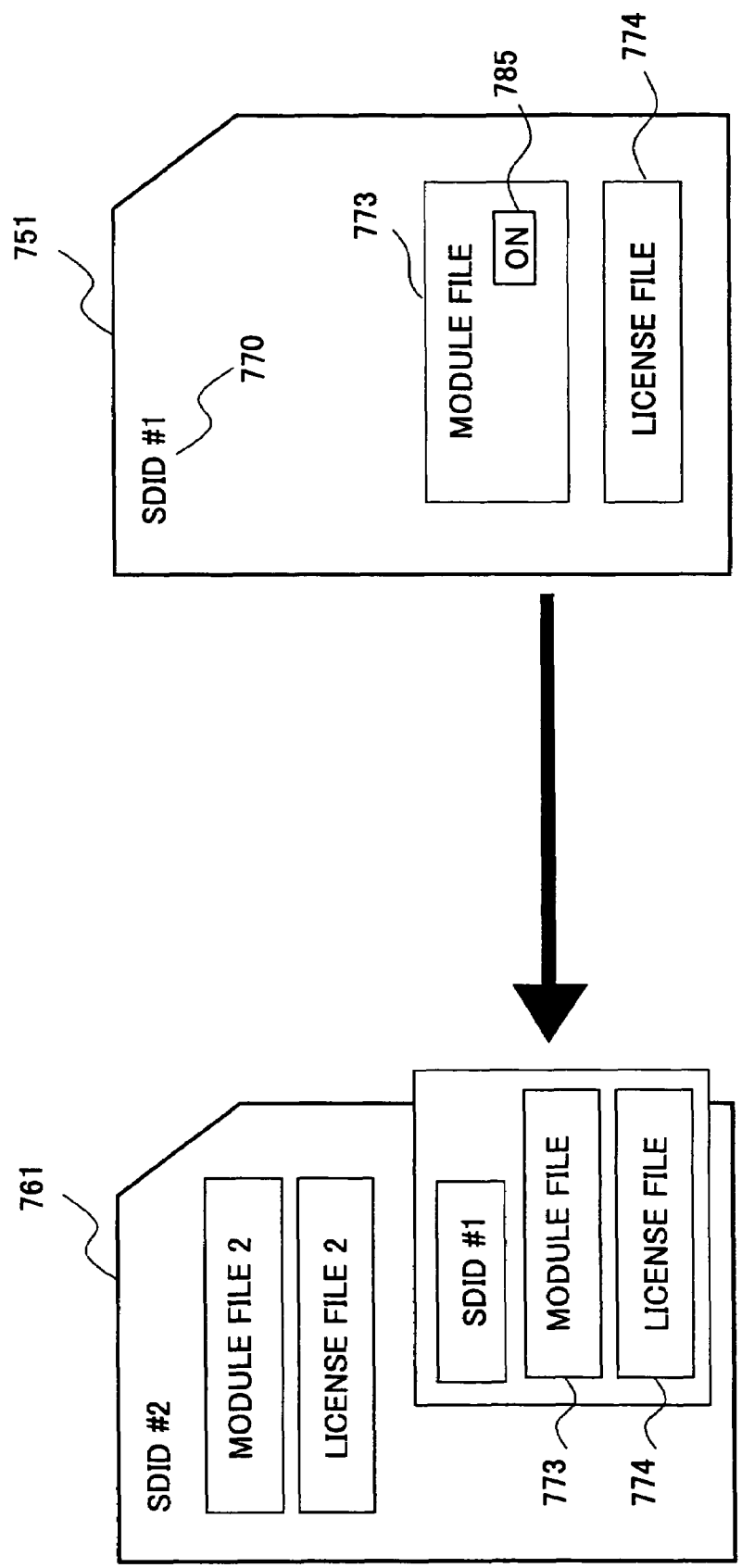
FIG. 18 illustrates a procedure of application module movement processing.

FIG. 18 shows a manner of the actual application module moving processing. As shown, the module file 773 and the license file 774 of the application module of the movement-source SD card 751 are copied to the movement-destination SD card 761, the SDID 770 (SDID #1) of the movement-source SD card 751 is written in the movement-destination SD card 761, and further, the license invalid flag 785 is turned ON.

As to the SDID of the SD card of the counterpart (that is, the movement-destination SD card 761 for the movement-source SD card 751, or the movement-source SD card 751 for the movement-destination SD card 761), it may be stored in a file. However, the SDID of the SD card of the counterpart may be stored in a management area at a predetermined address, which area a general user cannot access easily. The management area does not mean an area of the SD card in which a substance of the file is stored, but it means an area of the SD card in which management information of a file system such as a folder structure or such is stored.

Figure 19:
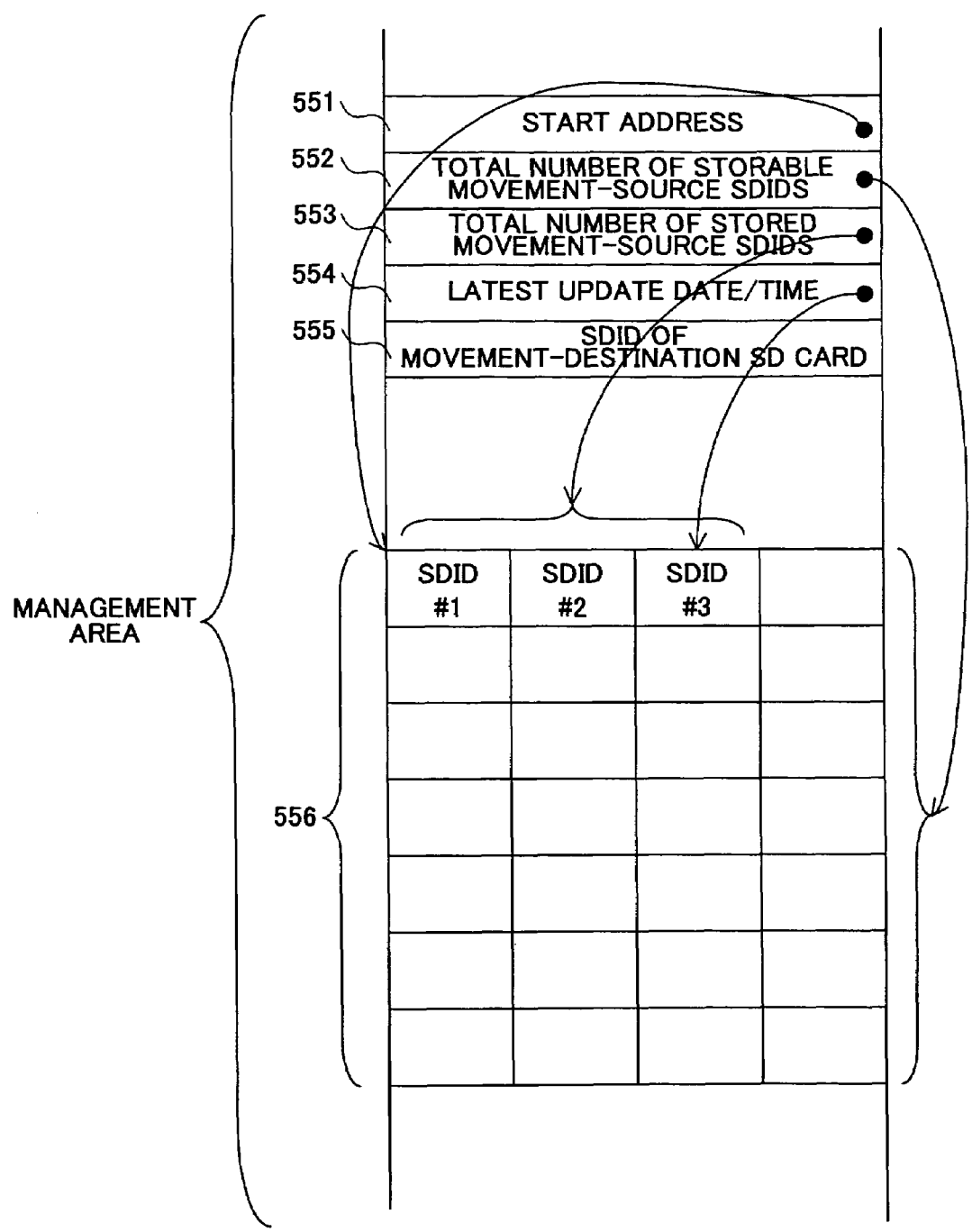
FIG. 19 shows a data structure of an SDID storage area of a counterpart in a SD card management area.

FIG. 19 shows a data structure of an area to store the SDID of the counterpart in the management area of the SD card. In FIG. 19, an area 551 is an area in which, when the relevant SD card is the movement-destination SD card 761, a starting address of an area, from which the SDID of the movement-source SD card 751 is stored, is stored. An area 552 is an area in which the number of the SDIDs which can be stored in the area 556 is stored. An area 553 is an area in which the number of the SDIDs currently stored in the area 556 is stored. An area 554 is an area in which dates/times at which the currently stored SDIDs were last written are stored. An area 555 is an area in which, when the relevant SD card is the movement-source SD card 751, the SDID of the movement-destination SD card 761 is stored.

In the above-described processing, the module list page 810, the module detail page 820, the module selection page 830 and so forth are displayed, and the user should carry out operation of selecting the application module to actually move and so forth. However, for example, if all the application modules stored in the movement-source SD card 751 are always moved, it is not necessary to cause the user to select the application modules to actually move. Therefore, more easy pages may be displayed instead.

Figure 20:
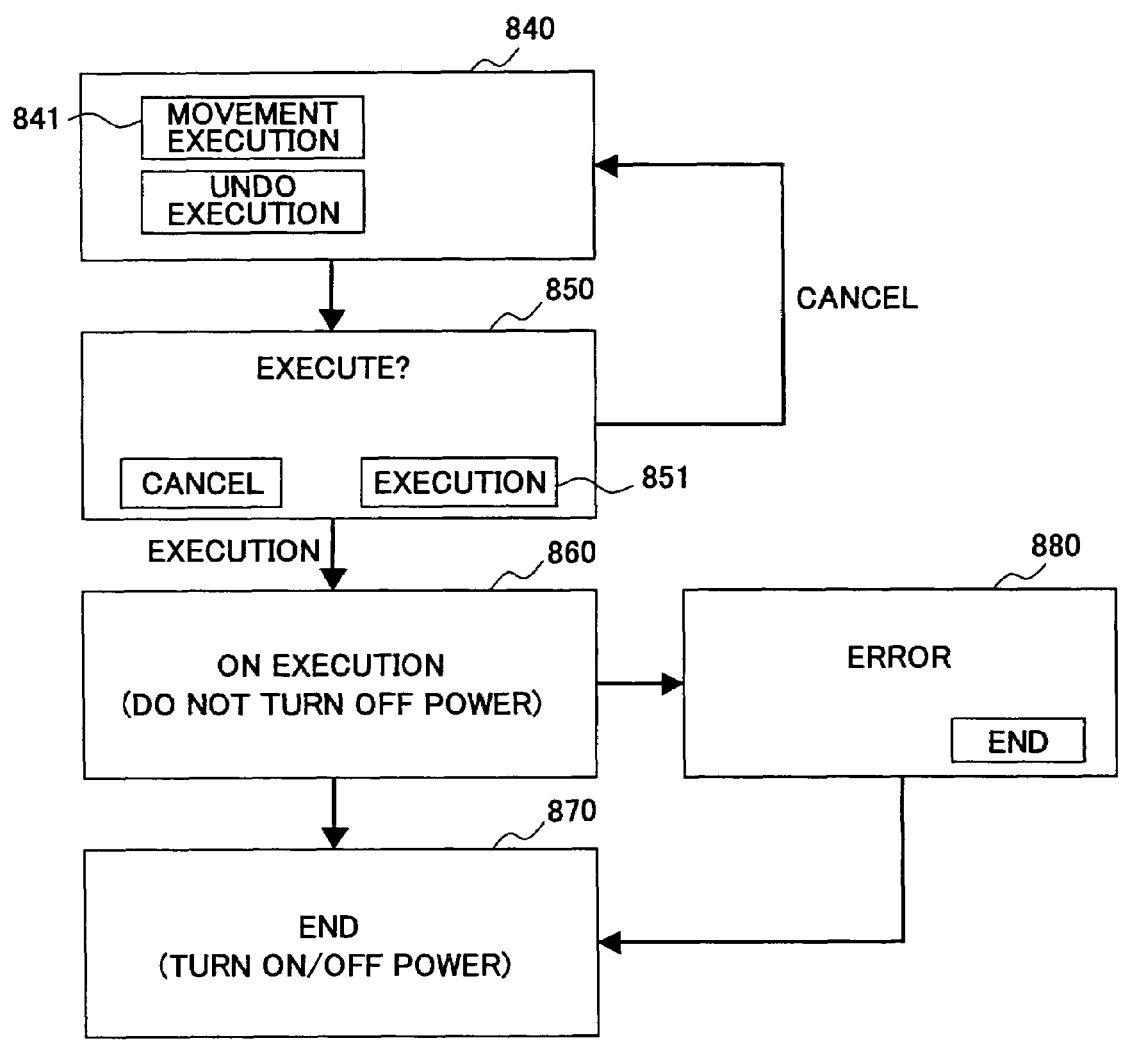
FIG. 20 shows an example of easy pages.

FIG. 20 shows an example of the easy pages. As shown, first, an initial page 840 for the user to input start of the moving processing is displayed. When a movement execution button 851 is pressed, a check page 850 is displayed. When an execution button 851 is pressed on the check page 850, a notification page 860 notifying that the moving processing is currently proceeded with is displayed. When the processing is finished, a finish page 870 is displayed. When an error occurs, an error page 880 is displayed.

If authentication processing were carried out according to the related art by the fusion machine 1 for the license data 778, that is, authentication with the use of the SDID 770 of the movement-destination SD card 761 were carried out upon execution of the application module generated in the movement-destination SD card 761 through the processing described above with reference to FIG. 14, the authentication of the license data 778 would not be succeeded in, and thus, the application module in the movement-destination could not be actually used, whereby the movement of the application modules would have no meaning accordingly.

Figure 21:
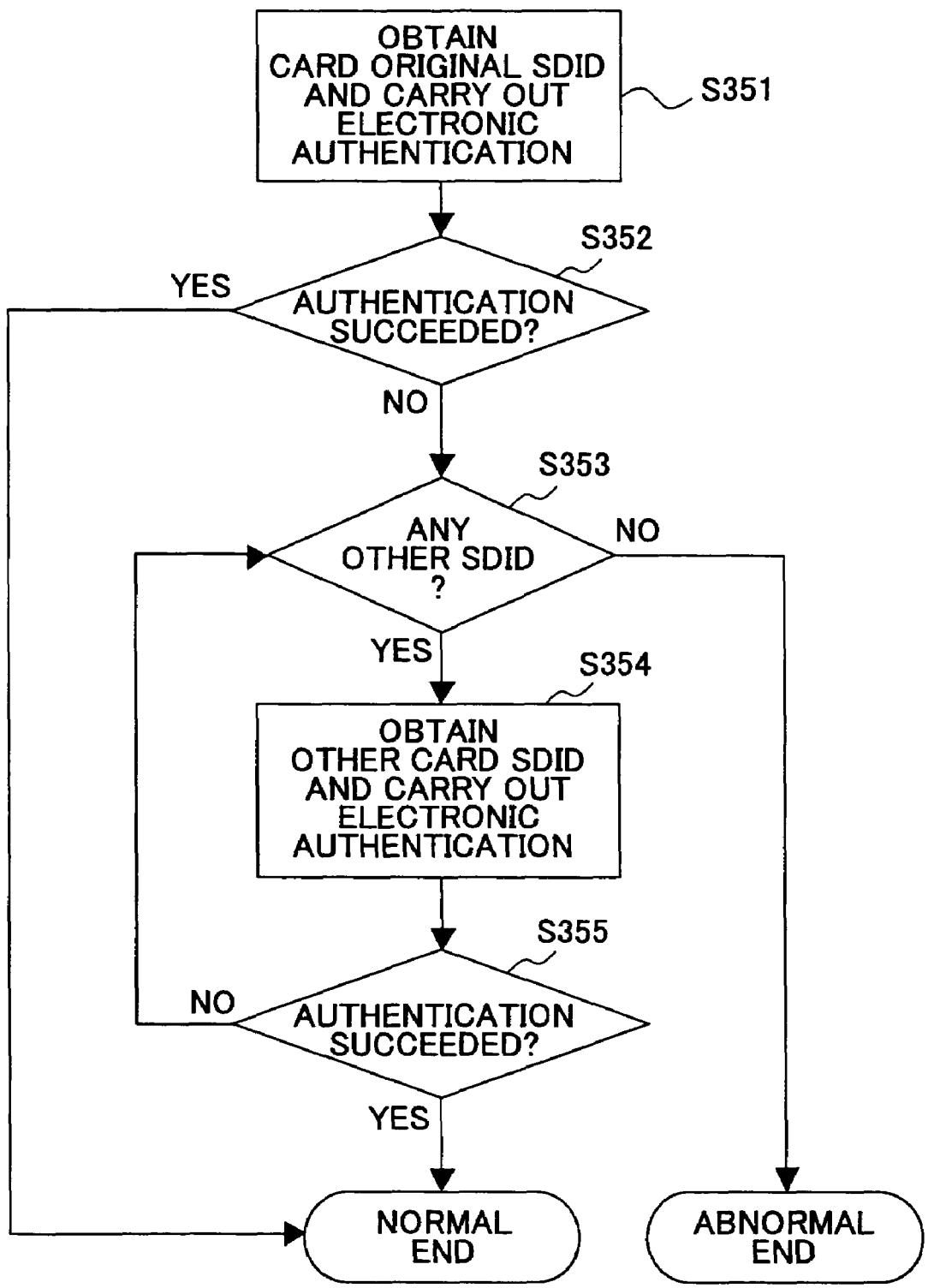
FIG. 21 shows a flow chart illustrating license data authentication processing.

Authentication processing according to the embodiment of the present invention, by which such a situation can be avoided, actually carried out by the fusion machine 1 is described next. FIG. 21 shows a flow chart illustrating the authentication processing of the license data.

First, in the same manner as that of the related art, the SCS 42 caries out electronic authentication for the license data 778 with the use of the original SDID 770 of the SD card 761 (referred tog as 'current SD card', hereinafter) in which the application module which is a target of the authentication is stored (S351). That is, the original SDID 770 and the license data 778 are digitized according to a message digest for example, and the thus-obtained value is compared with the value of the license electronic signature 779.

In Step S352 subsequent to Step S351, the SCS 42 determines whether or not the authentication has been succeeded in (the compared values agree with one another). When it is determined that the authentication has been succeeded in, the SCS 42 finishes the license data authentication processing normally. This is a case where, for example, the application module which thus undergoing the authenticate is not one which has been moved to the current SD card from another SD card.

On the other hand, when it is determined in Step S352 that the authentication has been failed in, Step S353 is carried out, and, the SCS 42*v* determines whether or not the SDID 770 (referred to as 'other SDID', hereinafter) of another SD card is written in the current SD card. When no other SDID is written there, the SCS 42 determines that the license data 778 is improper, and finishes the authentication processing abnormally. This is a case where, for example, the relevant application module is not one moved from another SD card properly but one tampered or such.

When another SDID is written in the current SD card, the SCS 42 carries out authentication of the license data 778 based on this other SDID, in Step S354. When it is determined that the authentication is succeeded in at this time (Yes in Step S355), the SCS 42 finishes the authentication processing of the license data normally. This is a case where the relevant application module is one properly moved from another SD card.

When the authentication is failed in (No in Step S355), the SCS 42 repeats authentication processing with the use of further another SDID written if any, and then, when the authentication is succeeded in at this time, the processing is finished normally. However, when the authentication has not been succeeded in even when any SDID written is used, the processing is finished abnormally.

As described above, in the fusion machine 1 according to the embodiment of the present invention, it is possible to move the application module, which is authenticated based on the SDID 770, to another SD card in such a condition that the application module may be used also in the movement destination, and thus, it is possible to use the application module thus-moved.

Further, since the application module in the movement-source SD card is invalidated and also authentication is carried out based on the SDID 770 when the application module in the movement-destination SD card is actually used, illegal copy is avoided as in the related art.

It is noted that, in the application module moving processing, the SDID 770 in the movement-source SD card 751 may be coded with the use of the SDID 770 of the movement-destination SD card 761 so as to strengthen a binding between the SDID 770 of the movement-source SD card 751 copied to the movement-destination SD card 761 and the movement-destination SD card 761.

Figure 22:
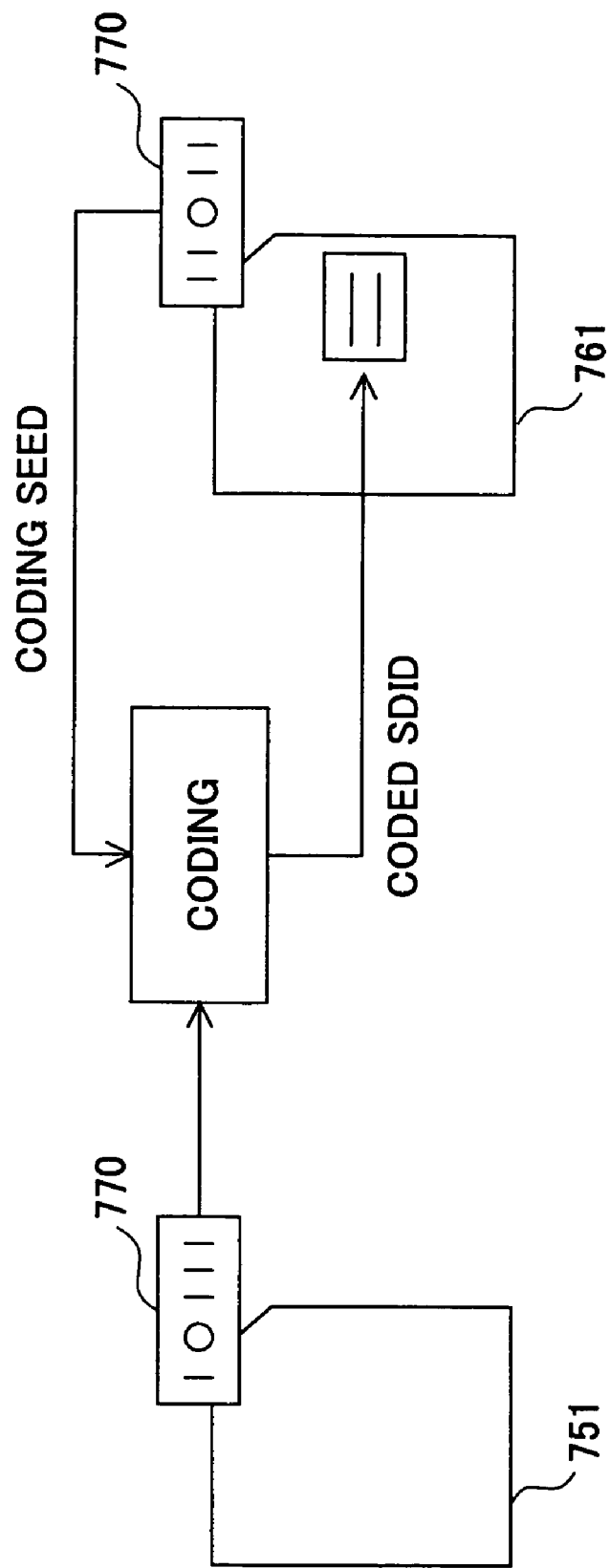
FIG. 22 shows one example in which an SDID in a movement-source SD card is coded with the use of an SDID of a movement-destination SD card.

FIG. 22 shows an example in which the SDID of the movement-source SD card 751 is coded with the use of the SDID of the movement-destination SD card. As shown in FIG. 22, when the SDID 770 of the movement-source SD card 751 is copied to the movement-destination SD card 761, the SDID 770 of the movement-destination SD card 761 is used as a seed of coding and the SDID 770 of the movement-source SD card 751 is used therewith. Then, the thus-coded SDID 770 is stored in the movement-destination SD card 761.

In this case, in order to authenticate the license data 778 of the application module for enabling execution of the application module moved to the movement-destination SD card

761, the once-coded SDID 770 should be decoded with the use of the SDID 770 of the movement-destination SD card 761. Therefore, if the application module and the coded SDID 776 were illegally copied to further another SD card, it is not possible to decode the coded SDID 770 with the use of the SDID 770 of the further another SD card. As a result, the thus-illegally copied application module cannot be executed.

In the above-described processing, the fusion machine 1 carries out the movement processing and also carries out the authentication of the moved application module (license data 778), for the purpose of simplification of the description. However, it is not necessary that a machine which carries out the movement of the application module and a machine which caries out the authentication of the moved application module are the same machine. For example, the moving processing may be carried out by another information processing apparatus in which the function of application moving processing is mounted, and the fusion machine 1 may use the thus-moved application module from the movement destination.

Further, it is not necessary to write the SDID 770 of the movement-source SD card 751 in the movement-destination SD card 761. What is at least necessary is that the SDID of the movement-source SD card 751 is written in a location (storage area) which the fusion machine 1 which actually uses the movement-destination application module can refer to.

Figure 23:
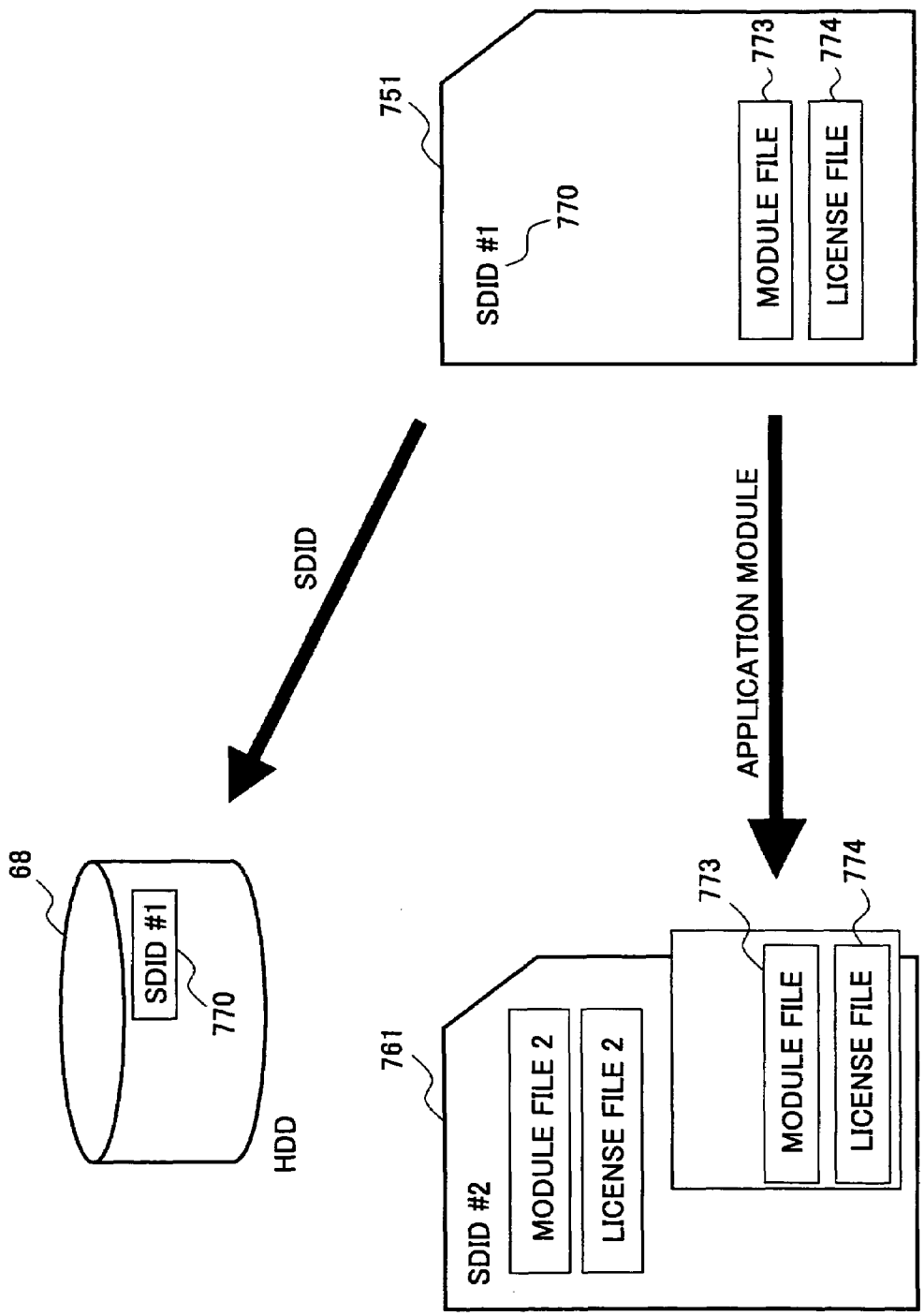
FIG. 23 shows one example in which the SDID of the movement-source SD card is written in a hard disk of the fusion machine.

For example, FIG. 23 shows an example in which the SDID 770 of the movement-source SD card 751 is written in a hard disk of the fusion machine 1. As shown, the module file 773 and the license file 774 of the target application module are copied to the movement-destination SD card 761, while the SDID 770 of the movement-source SD card 751 is written in the HDD 68 of the fusion machine 1.

Figure 24:
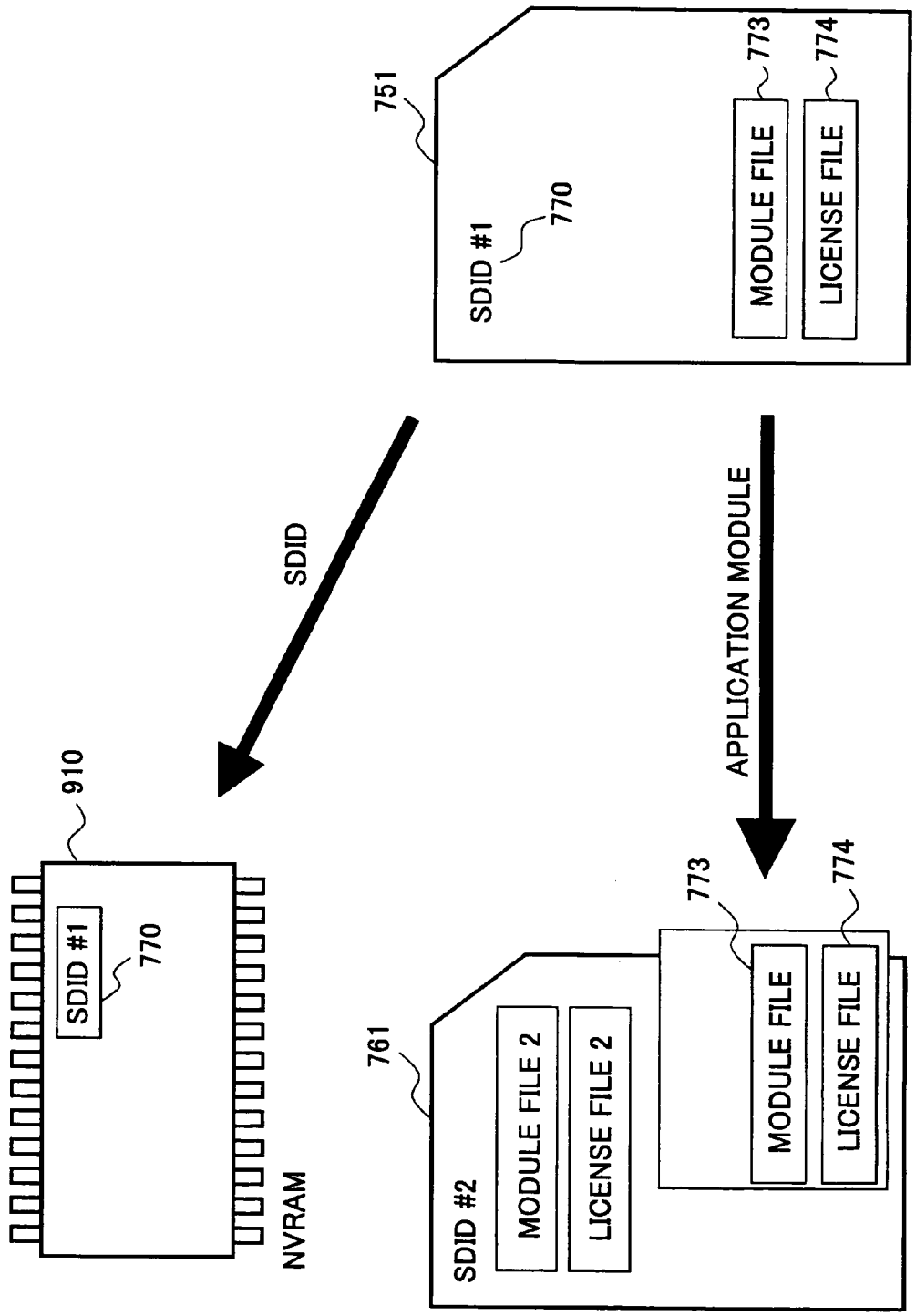
FIG. 24 shows one example in which the SDID of the movement-source SD card is written in an NVRAM of the fusion machine.

FIG. 24 shows an example in which the SDID 770 of the movement-source SD card 751 is written in an NVRAM of the fusion machine 1. As shown, the module file 773 and the license file 774 of the relevant application module are copied to the movement-destination SD card 761, while the SDID 770 of the movement-source SD card 751 is written in the NVRAM 910 of the fusion machine 1.

Figure 25:
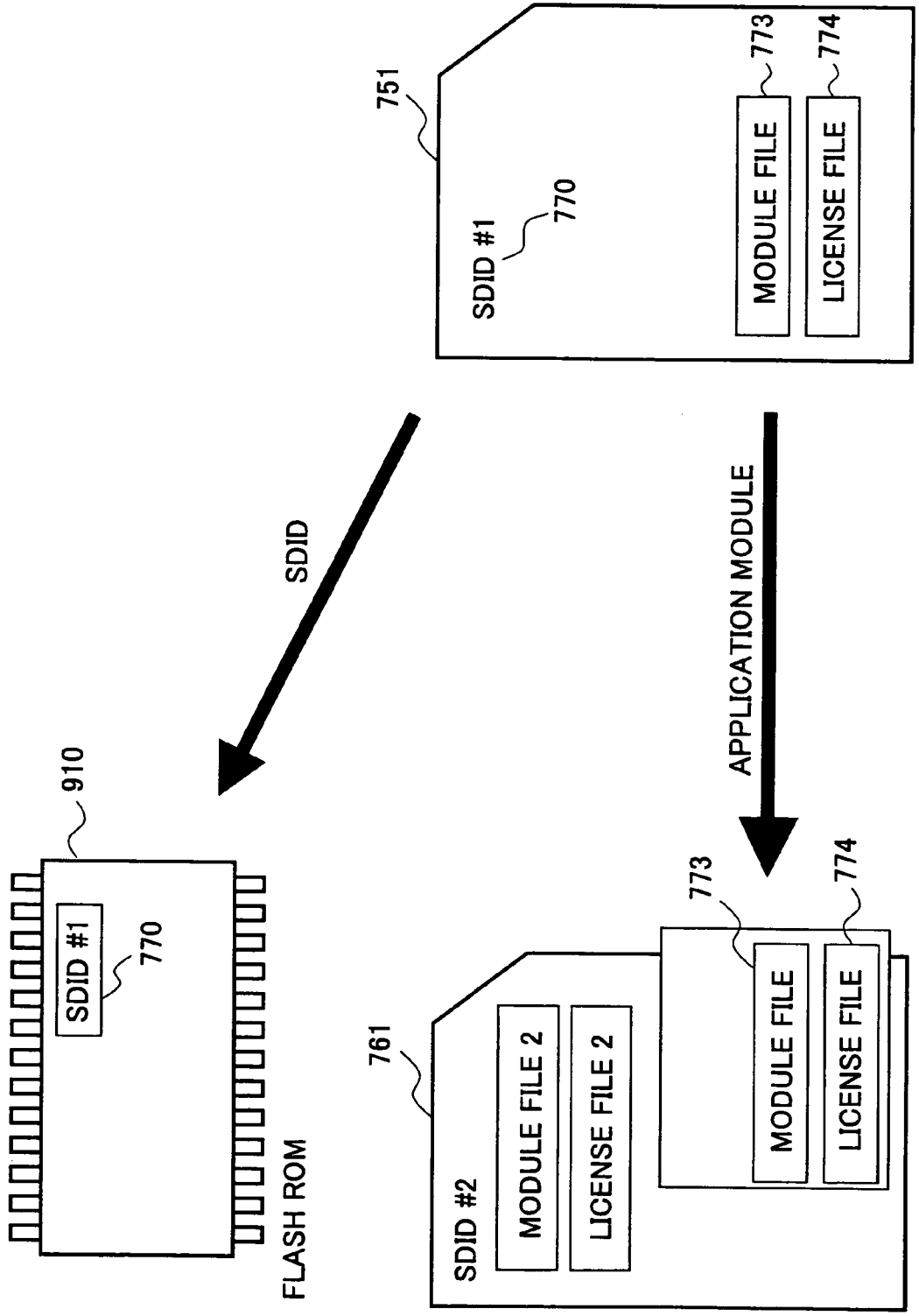
FIG. 25 shows one example in which the SDID of the movement-source SD card is written in a flash ROM of the fusion machine.

FIG. 25 shows an example in which the SDID 770 of the movement-source SD card 751 is written in a flash ROM of the fusion machine 1. As shown, the module file 773 and the license file 774 of the relevant application module are copied to the movement-destination SD card 761, while the SDID 770 of the movement-source SD card 751 is written in the flash ROM 920 of the fusion machine 1.

In any of these cases of FIGS. 23 through 25, the fusion machine 1 should carry out authentication of the license data 778 with the use of the SDID 770 written in the respective one of the HDD 68, the NVRAM 910 and the flash ROM 920.

Further, the present invention is applicable for a case where the application module itself is moved to a storage location other than the SD card.

Figure 26:
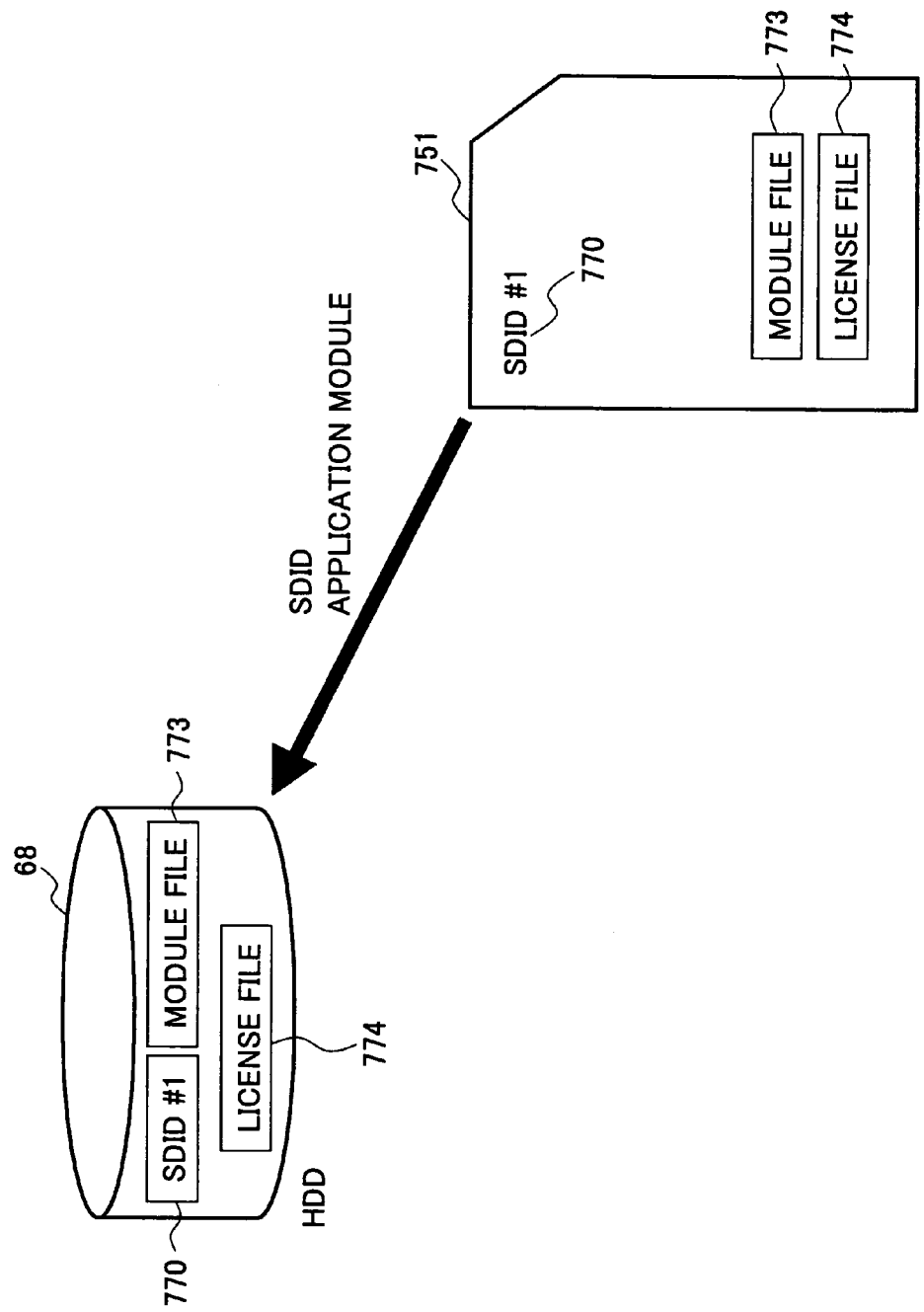
FIG. 26 shows one example in which an application module is moved to the hard disk of the fusion machine.

FIG. 26 shows an example in which the application module itself is moved to the hard disk of the fusion machine 1. As shown, the SDID 770 of the movement-source SD card 751 is written in the HDD 68 of the fusion machine 1, and also, the module file 773 and the license file 774 are written in the HDD 68 of the fusion machine 1.

Figure 27:
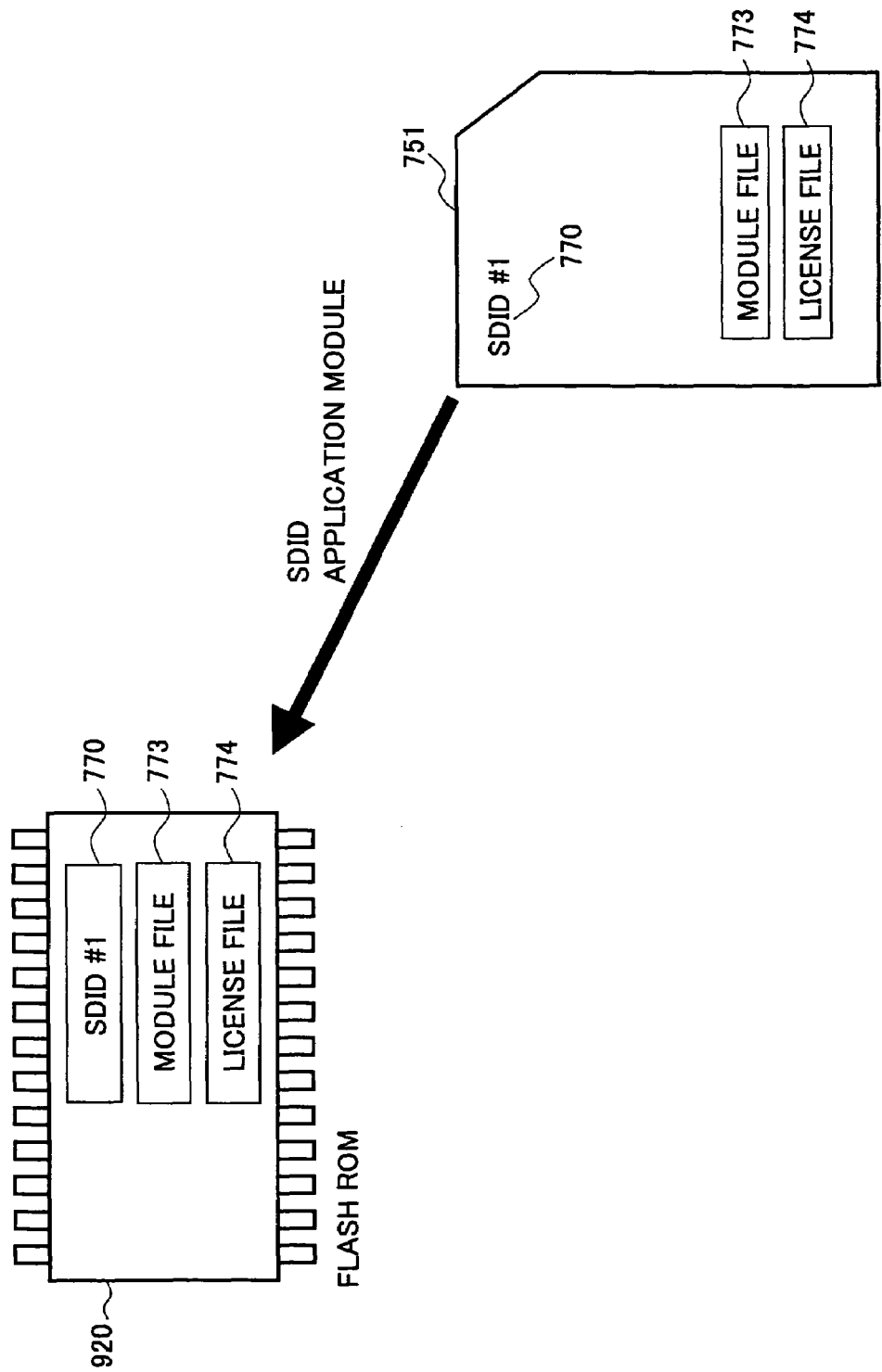
FIG. 27 shows an example in which the application module is moved to the flash ROM of the fusion machine.

FIG. 27 shows an example in which the application module itself is moved to the flash ROM of the fusion machine 1. As shown, the SDID 770 of the movement-source SD card 751 is written in the flash ROM 910 of the fusion machine 1, and also, the module file 773 and the license file 774 are written in the flash ROM 910 of the fusion machine 1.

Also in any of the above-described examples of FIGS. 23 through 27, it is possible to effectively avoid illegal copy as a result of the SDID 770 of the movement-source SD card being previously coded with the use of the SDID 770 of the movement-destination SD card.

There may be a case where the application module is erroneously moved, or a case where the once-moved application module should be returned to the original SD card (movement-source SD card 751) for some reason. For such a case, it is convenient to provide a function by which the above-described moving processing can be cancelled (UNDO function). Processing of canceling the moving processing according to the embodiment of the present invention is described next. Before carrying out this canceling processing, the movement-source SD card 751 should be inserted in any one of the SD slots 75 and 76 and the movement-destination SD card 761 should be inserted in the other SD slot.

First, the canceling processing is roughly described with reference to FIG. 7. When a user inputs execution of the canceling processing (S100, S150), Step S400 is carried out, and processing is carried out to obtain respective states of the movement-source SD card 751 and the movement-destination SD card 761 so as to determine whether or not both the SD cards are those having undergone the moving processing for which cancellation is now desired. Then, the module file 773 and the license file of the application module copied to the movement-destination SD card 761 in the relevant moving processing are deleted (Step S500). Further, the SDID 770 of the movement-source SD card 751 written in the movement-destination SD card 761 or another recording medium is also deleted (Step S600).

The processing (S400) of obtaining the states of the SD cards and the processing (S500) of deleting the application module from the movement destination are described below respectively in details.

Figure 28:
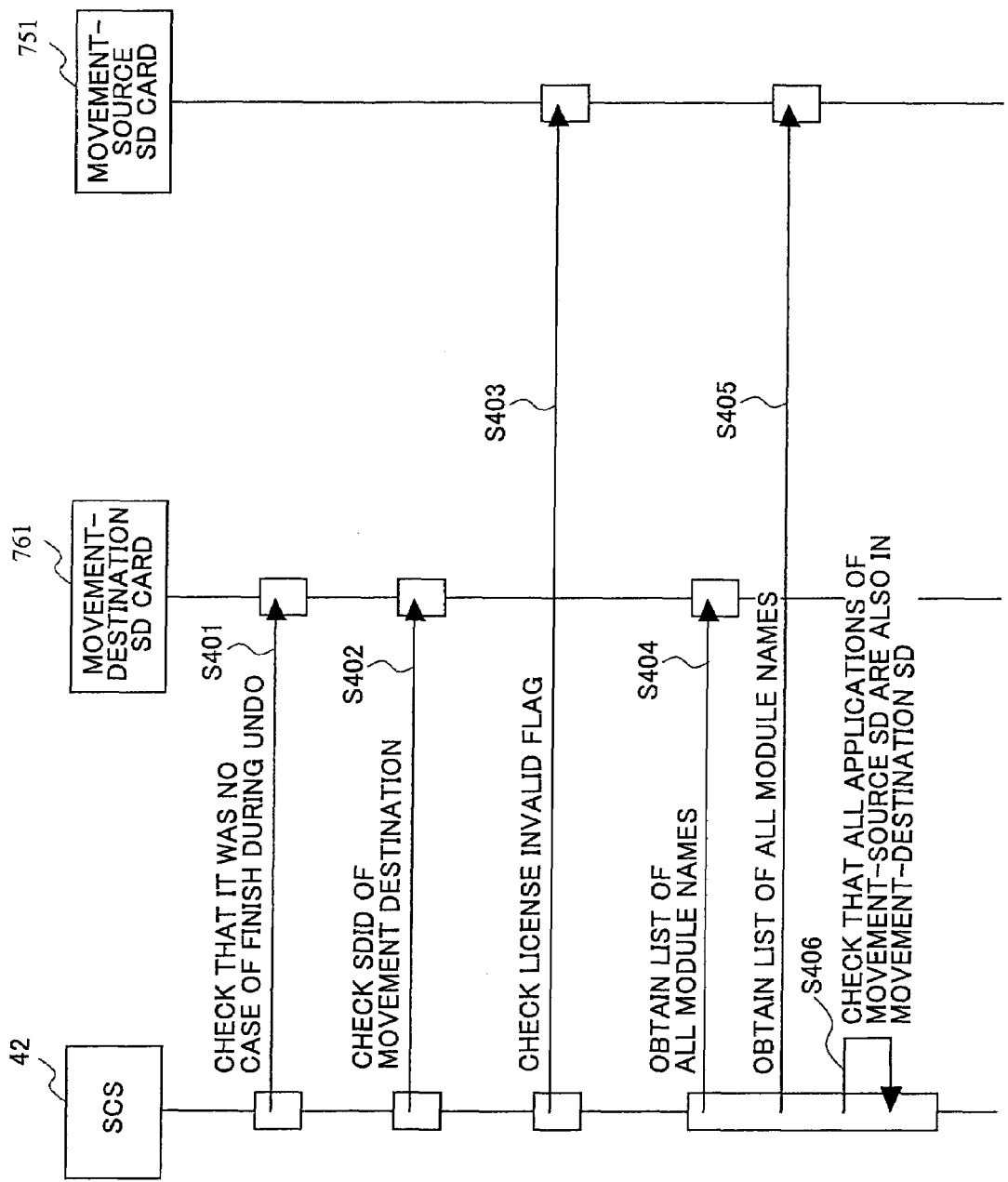
FIG. 28 shows a flow chart illustrating SD card state obtaining processing.

FIG. 28 shows a sequence diagram of the SD card state obtaining processing.

In Step S401, the SCS 42 refers to the movement-source SD card 761, and determines whether or not the canceling processing has been already carried out, and, at this time, the canceling processing was terminated due to some fault. Details of this determination are described later.

In Step S402 subsequent to Step S401, the SCS 42 determines whether or not the SDID 770 of the movement-source SD card 751 is written in the movement-destination SD card 761. As described above, in the moving processing according to the present embodiment, the SDID 770 of the movement-source SD card 751 is written in the movement-destination SD card 761. Accordingly, if the SDID 770 of the movement-source SD card 751 is not written in the movement-destination SD card 761, the SCS 42 determines that the movement-destination SD card 751 is not the movement destination with respect to the relevant movement-source SD card 751, and terminates the canceling processing.

However, as described with reference to FIG. 23 or 24, there may be a case where the SDID 770 of the movement-source SD card 751 is written in another recording medium. In such a case, the SCS 42 should determine whether or not the SDID 770 of the movement-source SD card 751 exists in the relevant other recording medium.

In Step S403 subsequent to Step S402, the SCS 42 refers to the license invalid flag 785 of the application module in the movement-source SD card 751, and determines whether or not the license invalid flag 785 is invalidated. When it is not invalidated, the SCS 42 determines that the movement-source SD card 751 is not the SD card which is regarded as the relevant movement source, and thus, terminates the canceling processing.

Then, the SCS 42 obtains list information of the module names of the application modules stored in the respective ones of the movement-destination SD card 761 and the movement-source SD card 751 (Steps S404, S405), and determines whether or not the application modules stored in the movement-destination SD card 761 include the application module (referred to as 'duplicate module', hereinafter) which is the same as that stored in the movement-source SD card 751. That is, if the movement-source SD card 751 is the relevant movement source of the movement-destination SD card 761, the movement-source SD card 751 should have the application module stored therein the same as that stored in the movement-destination SD card 761.

When the duplicate module cannot be found, the SCS 42 determines that both SD cards do not correspond to those having the correspondence relationship concerning the movement processing, and terminates the canceling processing. On the other hand, when existence of the duplicate module is confirmed, the SCS 42 determines that correspondence relationship between both SD cards has been confirmed, and as a result carries out application module deletion processing (S500).

Figure 29:
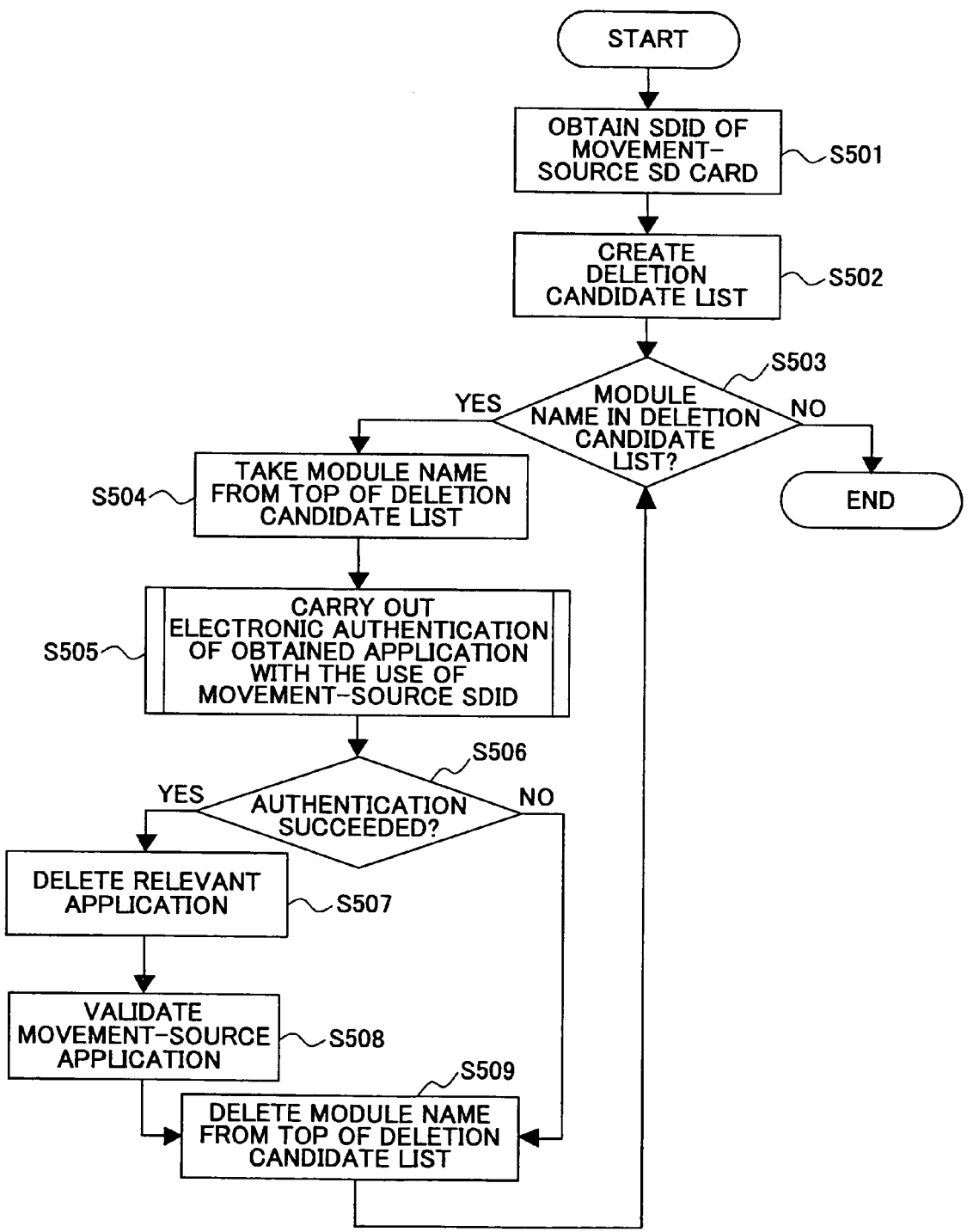
FIG. 29 shows a flow chart illustrating application module deleting processing at a movement destination.

FIG. 29 shows a flow chart illustrating the movement destination application module deletion processing.

In Step S501, the SCS 42 obtains the SDID 770 (referred to as 'movement-source SDID', hereinafter) of the movement-source SD card 751, from the movement-source SD card 751.

In Step S502 subsequent to Step S501, the SCS 42 writes list information (referred to as 'deletion candidate list', hereinafter) of the module names of the duplicate modules for which the existence has been confirmed in Step S406 (FIG. 28) as deletion candidates, in the movement-destination SD card 761.

After that, processing should be carried out only for the application modules for which the module names are included in the thus-created deletion candidate list, and thus, processing efficiency can be improved.

In Step S503 subsequent to Step S502, the SCS 42 determines whether or not any module names exist in the deletion candidate list. When module names exist, Step S504 is carried out, and the module name located at the top of the deletion candidate list is taken (the thus-taken module name is referred to as 'current module name', and the application module of the current module name is referred to as 'current module', hereinafter).

In Step S505 subsequent to Step S504, the SCS 42 carries out authentication of the license data 778 of the current module based on the movement-source SDID, and thereby determines whether or not the movement source of the current module is positively the relevant movement-source SD card 751.

This processing is carried out to avoid erroneously delete the application module for a possible case where the application module having the module name the same as that of the application module existing in the movement-source SD card 751 previously exists (different from that moved from another SD card) in the movement-destination SD card 761, a case where the same was moved from another SD card or such.

In Step S506 subsequent to Step S505, the SCS 42 determines success/failure of the authentication of the current module. When it is determined that the authentication is succeeded in, Step S507 is carried out, and the SCS 42 determines that the current module is positively one which was moved from the relevant movement-source SD card 751. Then, the SCS 42 deletes the module file 773 and the license file 774 of the current module from the movement-destination SD card 761, and also, clears the license invalid flag of the current module in the movement-source SD card 751 (Step S508). Thereby, the application module in the movement source becomes usable again.

On the other hand, when it is determined that the authentication is failed in, in Step S506, the current module is determined as not being one which was moved from the relevant movement-source SD card 751, and thus, deletion of the current module and so forth is not carried out.

In Step S509 subsequent to Step S508 or Step S506, the SCS 52 deletes the current module name from the deletion candidate list, and carries out the processing, starting from the Step S503, for each of all the application modules remaining in the deletion candidate list.

After that, the movement-source SDID is deleted form the movement-destination SD card 761 or another recording medium in which the same is previously written (S600), and thus, the canceling processing is completed. In the case where the license invalid flag is provided not for each application module but for each SD card, the license invalid flag 771*b* of the movement-source SD card 751 should be cleared at the timing of Step S600.

In Step S403, the deletion candidate list is used to determine whether or not the previous canceling processing was properly finished. That is, when the deletion candidate list is left undeleted in the movement-destination SD card 761, the SCS 42 determines that the previous canceling processing is terminated on the way due to a failure, and carries out the processing, starting from Step S503, based on the left deletion candidate list.

As described above, in the fusion machine 1 according to the embodiment of the present invention, it is possible to return the movement-source SD card 751 and the movement-destination SD card 761 to the respective states before the application module moving processing was carried out, after once the application module moving processing was carried out.

Figure 30:
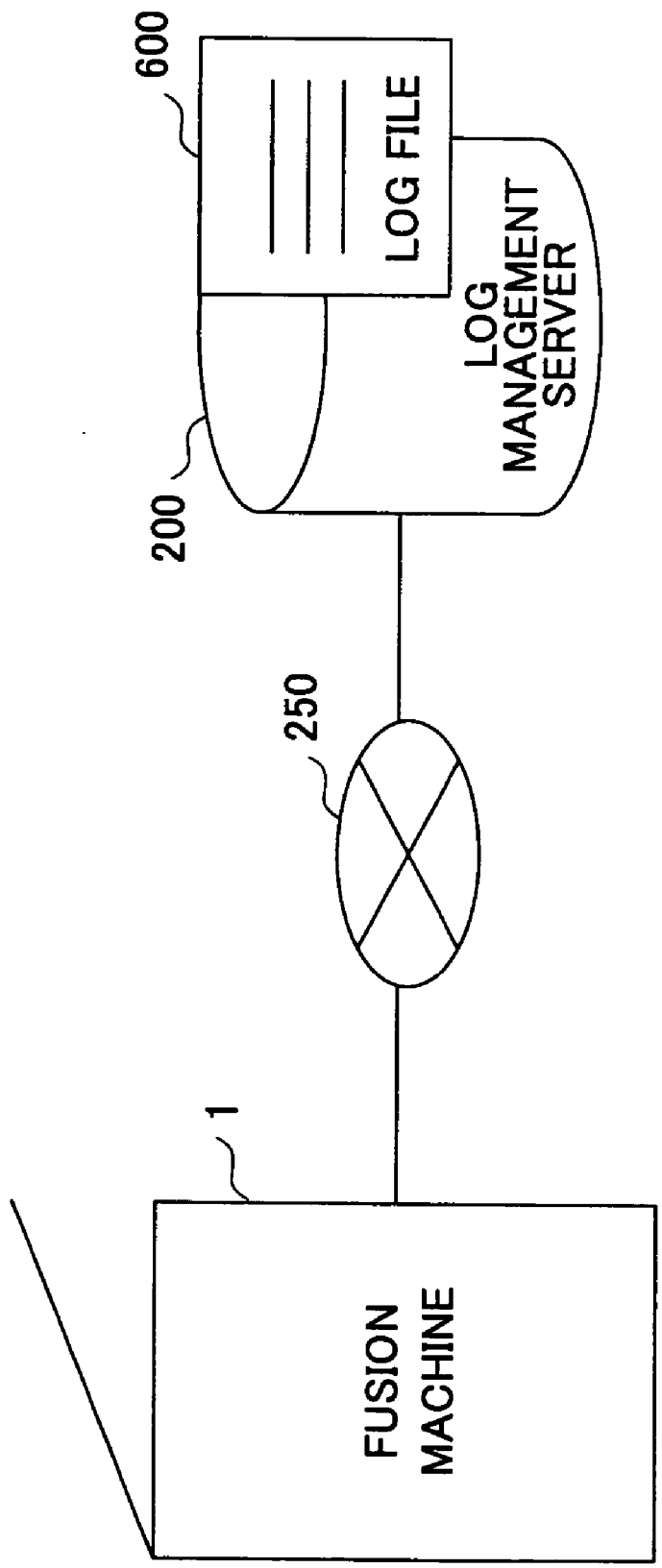
FIG. 30 shows an example of a system configuration in a case where a log file is recorded in a management server.

In the above, description has been made that the log file generated during the movement of the module file is recorded in the movement-destination SD card 761. However, a recording location of the log file is not limited to the movement-destination SD card 761. For example, the log file may be recorded, instead, in a computer (referred to as a 'log management server', hereinafter) which is connected with the fusion machine 1 via a communication network. An example in which the log file is thus recorded in the log management server is described below:

FIG. 30 shows a system configuration example for a case where the log file is recorded in the log management server. As shown, the fusion machine 1 is connected with the log management server 200 via a network 250 (by a cable or a radio) such as a LAN (local area network), the Internet, or such. The log management server 200 is a computer which manages the log file 600 in which a log of the module moving processing between the SD cards carried out by the fusion machine 1 is recorded.

Figure 31:
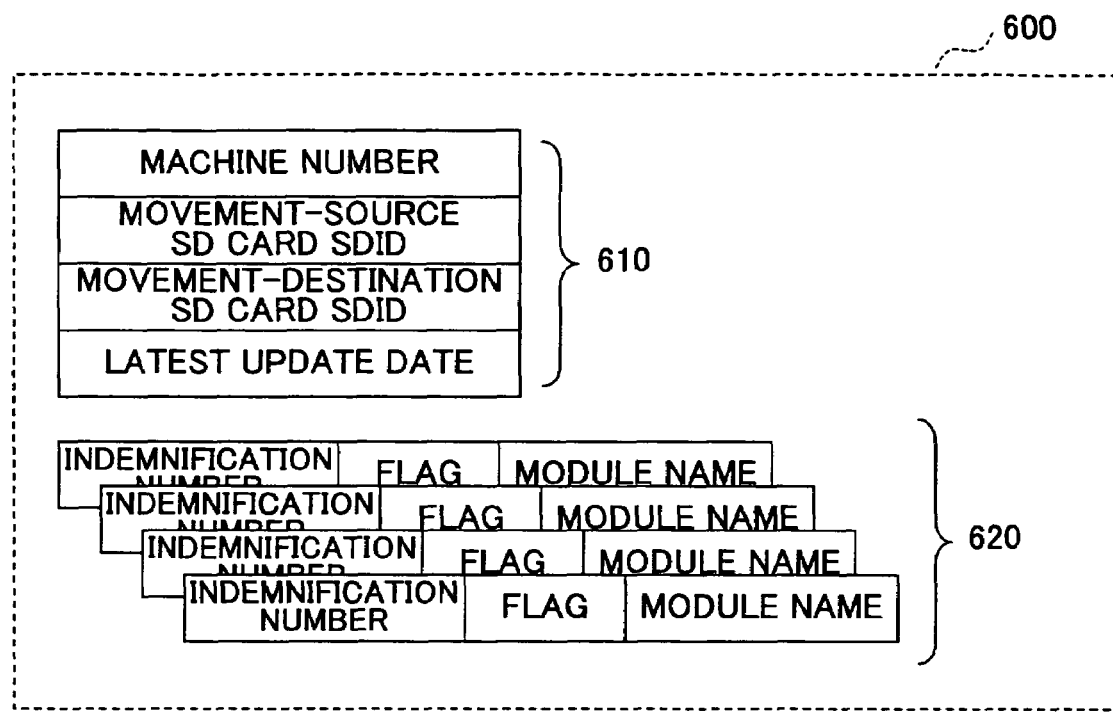
FIG. 31 shows one example of a form of the log file in a case where the log file is recorded in the management server.

FIG. 31 shows an example of a file format of the log file applied when the log file is recorded in the log management server 200. As shown, in the log file 600, in addition to the log information 620 described above, header information 610 is recorded. The header information 610 includes, for example, a machine number, the SDID of the movement-source SD card 751, the SDID of the movement-destination SD card, the latest update date and so forth. The machine number is a number given to each fusion machine for the purpose of identifying it. That is, the machine number is used for identifying the log file belonging to each particular machine when the log management server 200 manages a plurality of fusion machines. The SDIDs of the movement-source SD card 751 and the movement-destination SD card 761 are used to identify the SD cards for which the moving processing is carried out. The latest update date is a date/time at which the log file 600 was updated at the last. When a storage duration for the log file 600 is prescribed, this information may be used to determine, for each log file, whether or not the storage duration has expired.

Figure 32:
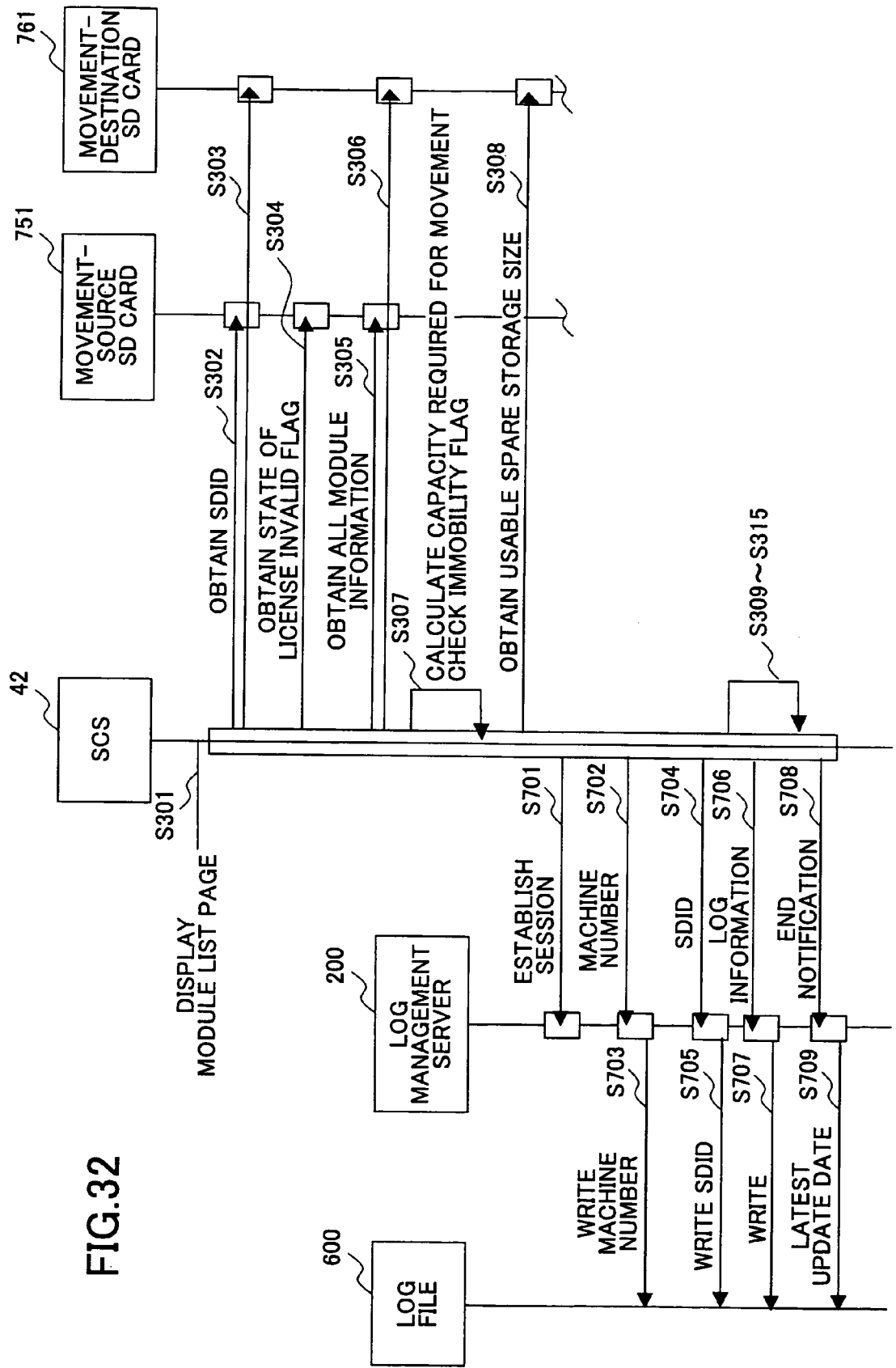
FIG. 32 shows a flow chart illustrating module file movement processing in a case where the log file is recorded in the management server.

FIG. 32 shows a sequence diagram of the module moving processing in a case where the log file is recorded in the log management server 200. The sequence diagram of FIG. 32 corresponds to the sequence diagram of FIG. 14, the same reference numerals are given to parts the same as those shown in FIG. 14, and the duplicate description therefore is omitted.

After carrying out processing of determination as to whether or not the module file movement is actually carried out and so forth in Steps S301 through S308, the SCS 42 establishes a session with the log management server 200 (S701). In Step S702 subsequent to Step S701, the SCS 42 transmits the machine number of the fusion machine 1 to the log management server 200. In response thereto, the log management server 200 writes the machine number of the fusion machine 1 in the header information in Step S703.

In Step 704 subsequent to Step S703, the SCS 42 transmits the SDID of the movement-source SD card 751 and the SDID of the movement-destination SD card 761 to the log management server 200, which then writes these SDIDs in the header information (Step S705).

Then, during Steps 309 through 315, along with the actual moving processing of the module file and so forth, the SCS 42 transmits the log information to the log management server 200 (Step S706), which then updates the log file 600 based on the thus-received log information (Step S707). After the module moving processing is completed, the SCS 42 notifies the finish of the moving processing to the log management server 200 (Step S708), which then writes the latest update date in the header information of the log file 600 (Step S709).

It is noted that, the log file 600 should not be necessarily deleted even after the moving processing is finished. For example, the log file may be left, and may be used for security check processing carried out when the fusion machine 1 starts up the application from the SD card. That is, when the application is started up from the SD card, if the log file has a last log which indicates that this application was moved to another SD card, this application should be invalidated in the present SD card. In such a case, if this application is not actually invalidated in the present SD card, it can be detected that the license invalid flag 771 or 785 may have been tampered by some improper measure or such.

If the above-mentioned copy state flags are rewritten via the communication network, the communication information amount increases accordingly, whereby the processing speed of the module file moving processing may be degraded. Further, it is not necessary to store information, in the log file, such as the above-mentioned on-copy flag which indicates an intermediate process state. Therefore, only the copy state flags may not be recorded in the log file but may be recorded in the movement-destination SD card 761.

Figure 33:
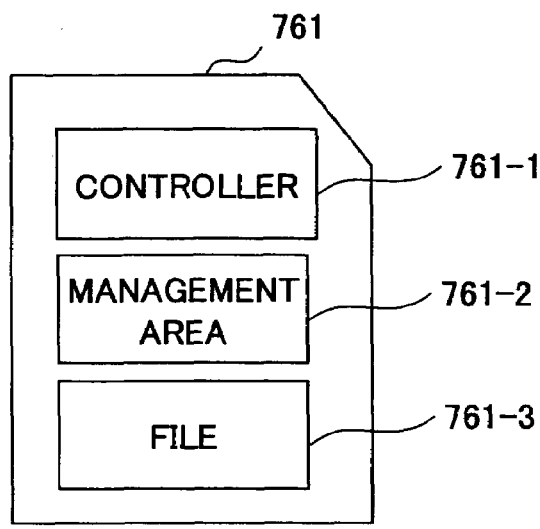
FIG. 33 illustrates an area in which copy state flags are written.

FIG. 33 illustrates an area in which the copy state flags are written. As shown, a storage area of the movement-destination SD card 761 includes a controller area 761-1, a management area 761-2, and a file area 761-3. The copy state flags may be written in any area thereamong. For example, when the copy state flags are written in the controller area 761-1 or the management area 761-2, information bits at predetermined addresses within the relevant area may be used. When the copy state flags are written in the file area 761-3, they may be recorded in a predetermined file. The file area 761-3 is an area used for writing a substance of a file. The management area 761-2 is an area in which file system management information such as a folder structure or such is written.

Recently, an SD card to which a so-called radio IC tag (such as an RFID tag) is attached is provided. Upon applying such a type of an SD card, the license file 774 may be stored in the radio IC tag, for example.

Figure 34:
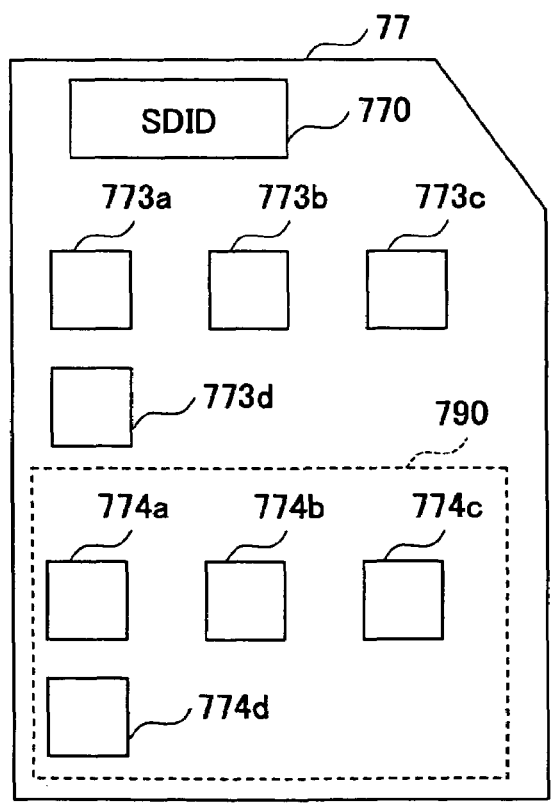
FIG. 34 shows an example in which a license file is stored in a radio IC tag.

FIG. 34 shows an example in which the license file is stored in the radio IC tag. In FIG. 34, rectangles 773*a* through 773*d* included in the SD card 77 denote the module files 773 of the respective application modules. Rectangles 774*a* through 774*d* denote the license files of the respective application modules. As shown, the license files 774*a* through 774*d* are stored in the radio IC tag 790. The radio IC tag 790 may be built in the SD card 77, or may be attached to the SD card instead of a decal. There is a radio IC tag having a coding function on the market. By applying such a type of radio IC tag, it is possible to effectively avoid illegal usage of the license files 774. Further, it is preferable to apply, to the radio IC tag 790, a type of radio IC tag having a security function such as a coding function so that it may become also possible to safely store the license files 774 and so forth and effectively avoid illegal usage of the license files 774 and so forth.

Although the SD card is mainly applied as a recording medium in the above-described embodiment, the present invention may be applied to any other various types of recording media.

Further, electronic data to be moved is not limited to a program such as the application module as in the embodiment described above. For example, image data, sound data (audio data), motion picture data (video data) or such, for which illegal copy should be avoided, may be applied widely instead.

Further, the present invention is not limited to the above-described embodiments, and variations and modifications may be made without departing from the basic concept of the present invention claimed.

The present application is based on Japanese Priority Applications No. 2003-416454, filed on Dec. 15, 2003, the entire contents of which are hereby incorporated herein by reference.

What is claimed is:

1. An electronic data movement apparatus, comprising
a first storage device;
a second storage device;
a movement part comprising:
a storage device identification number obtaining part configured to obtain a first storage device identification number unique to the first storage device from the first storage device and a second storage device identification number unique to the second storage device from the second storage device,
a judgment part configured to determine if a license invalidity flag stored in the first storage device is in an "ON" state,
a first movement part configured to move a module file stored in the first storage device, to the second storage device, when the license invalidity flag is determined by the judgment part to be in an "OFF" state,
an invalidity part configured to change the license invalidity flag stored in the first storage device, from "OFF" to "ON", and
a second movement part configured to move the first storage device identification number to the second storage device;
a movement canceling part comprising:
a judgment part configured to judge whether the first storage device identification is stored in the second storage device, an invalidity part configured to check whether the license invalidity flag stored in the first storage device is "ON", a verification part configured to verify whether the module file in the second storage device is moved from the first storage device by using a license file stored in the first storage device, and a movement canceling execution part configured to delete the module file in the second storage device, when the first storage device identification is stored in the second storage device, the license invalidity flag stored in the first storage device is "ON", and the module file in the second storage device is moved from the first storage device, wherein the license file comprises a license data and a license electronic signature, and wherein the movement canceling part further includes a digitizing part configured to digitize the license data and compare the digitized license data to the license electronic signature to verify validity of the license data.

2. The apparatus of claim 1, wherein the module file comprises at least one data selected from the group consisting of a program data a module information, and a module electronic signature.

3. The apparatus of claim 2, wherein the module file comprises the program data.

4. The apparatus of claim 2, wherein the module file comprises the program data and the module electronic signature.

5. The apparatus of claim 1, wherein the module file comprises the license invalidity flag.

6. The apparatus of claim 1, wherein at least one of the first storage device and the second storage device is a secure digital (SD) card.

7. The apparatus of claim 1, wherein both the first storage device and the second storage device are secure digital (SD) cards.

8. The apparatus of claim 1, wherein the movement canceling part further includes a determining part configured to determine if the license file, the module file, and the first storage device identification number stored on the second storage device were copied from the first storage device.

9. The apparatus of claim 2, wherein the module file comprises the program data, the module information, and the module electronic signature, and wherein the module information comprises an electronic signature information key.

10. The apparatus of claim 9, wherein the movement canceling part further includes a digitizing part configured to digitize the program data, decode the module electronic signature with the electronic signature key, and compare the digitized program data with the decoded module electronic signature.

11. The apparatus of claim 1, wherein the electronic data movement apparatus is a fusion machine.

12. An electronic data movement method executed using an electronic data movement apparatus having a first storage device and a second storage device, the method comprising:

obtaining a first storage device identification number unique to the first storage device from the first storage device and a second storage device identification number unique to the second storage device from the second storage device;

checking if a license invalidity flag stored in the first storage device is in an "ON" state;

moving a module file stored in the first storage device, to the second storage device, when the license invalidity flag is not in an "ON" state;

changing the license invalidity flag stored in the first storage device, from "OFF" to "ON";

moving the first storage device identification number to the second storage device;

judging whether the first storage device identification is stored in the second storage device;

checking whether the license invalidity flag stored in the first storage device is "ON";

verifying whether the module file in the second storage device is moved from the first storage device by using a license file stored in the first storage device;

deleting the module file in the second storage device, when the first storage device identification is stored in the second storage device, the license invalidity flag stored in the first storage device is "ON", and the module file in the second storage device is moved from the first storage device; and after the deleting, digitizing a license data and comparing the digitized license data to a license electronic signature to verify validity of the license data, wherein the license file comprises the license data and the license electronic signature.

13. The method of claim 12, wherein the module file comprises at least one data selected from the group consisting of a program data a module information, and a module electronic signature.

14. The method of claim 13, wherein the module file comprises the program data.

15. The method of claim 13, wherein the module file comprises the program data and the module electronic signature.

16. The method of claim 12, wherein the module file comprises the license invalidity flag.

17. The method of claim 12, wherein at least one of the first storage device and the second storage device is a secure digital (SD) card.

18. The method of claim 12, wherein both the first storage device and the second storage device are secure digital (SD) cards.

19. The method of claim 12, further comprising, before the deleting, determining that the license file, the module file, and the first storage device identification number stored on the second storage device were copied from the first storage device.

20. The method of claim 13, wherein the module file comprises the program data, the module information, and the module electronic signature, and wherein the module information comprises an electronic signature information key.

21. The method of claim 20, further comprising, after the deleting, digitizing the program data, decoding the module electronic signature with the electronic signature key, and comparing the digitized program data with the decoded module electronic signature.

22. The method of claim 12, wherein the electronic data movement apparatus is a fusion machine.

23. The apparatus of claim 1, wherein the movement part further comprises a third movement part configured to move the module file moved to the second storage device by the first movement part to a third storage device distinct from the first storage device when the license invalidity flag of the second storage device is determined to be in an "OFF" state.

24. The apparatus of claim 1, wherein the license invalidity flag stored in the first storage device is changed from "OFF" to "ON" by changing the value of the license invalidity flag to the second storage device identification number.

* * * * *